United States Patent [19]
Moore et al.

[11] 3,860,028
[45] Jan. 14, 1975

[54] FLUID LEVEL CONTROL SYSTEM AND FLUID LEVEL ACTUATED CONTROLLER THEREFOR

[75] Inventors: Beal P. Moore, Waldwick; Raymond J. Dussia, Chatham, both of N.J.

[73] Assignee: Atlas Valve Company, Newark, N.J.

[22] Filed: Jan. 22, 1973

[21] Appl. No.: 325,129

[52] U.S. Cl. .................. 137/411, 137/391, 137/413, 137/446, 137/636.1
[51] Int. Cl. ............................................ F16k 31/34
[58] Field of Search ............ 137/386, 391, 411, 412, 137/413, 426, 434, 446, 445, 636, 636.1

[56] References Cited
UNITED STATES PATENTS

| | | | |
|---|---|---|---|
| 2,338,319 | 1/1944 | DeLancey | 137/411 X |
| 2,580,731 | 1/1952 | Cochin | 137/636.1 |
| 2,739,576 | 3/1956 | Ricardo | 137/411 X |
| 2,882,724 | 4/1959 | Smith | 137/391 X |
| 2,966,172 | 12/1960 | Smith | 137/391 X |
| 3,001,398 | 9/1961 | Shepherd | 137/391 X |
| 3,205,907 | 9/1965 | Reese | 137/391 X |

FOREIGN PATENTS OR APPLICATIONS

| | | | |
|---|---|---|---|
| 792,959 | 11/1935 | France | 137/411 |

Primary Examiner—Martin P. Schwadron
Assistant Examiner—David R. Matthews
Attorney, Agent, or Firm—Daniel H. Bobis

[57] ABSTRACT

A system for monitoring the fluid level in a tank having a fluid level actuated controller for sending a modulated signal to at least one or more control valves each performing separate functions to maintain the fluid in the tank between predetermined minimum and predetermined maximum levels.

Additionally, a fluid level actuated controller having at least one or more pilot valve assemblies therein each adapted to deliver a modulated fluid signal for operating an associated control device such as a control valve in a fluid level control system, and fluid level actuated means operatively connected to the pilot valve assemblies for varying the modulated signal delivered by each respective pilot valve assembly as a function of the fluid level being monitored, and means for adjusting engagement of each of said pilot valve assemblies with the liquid level actuated means.

13 Claims, 29 Drawing Figures

PATENTED JAN 14 1975
3,860,028
SHEET 1 OF 9

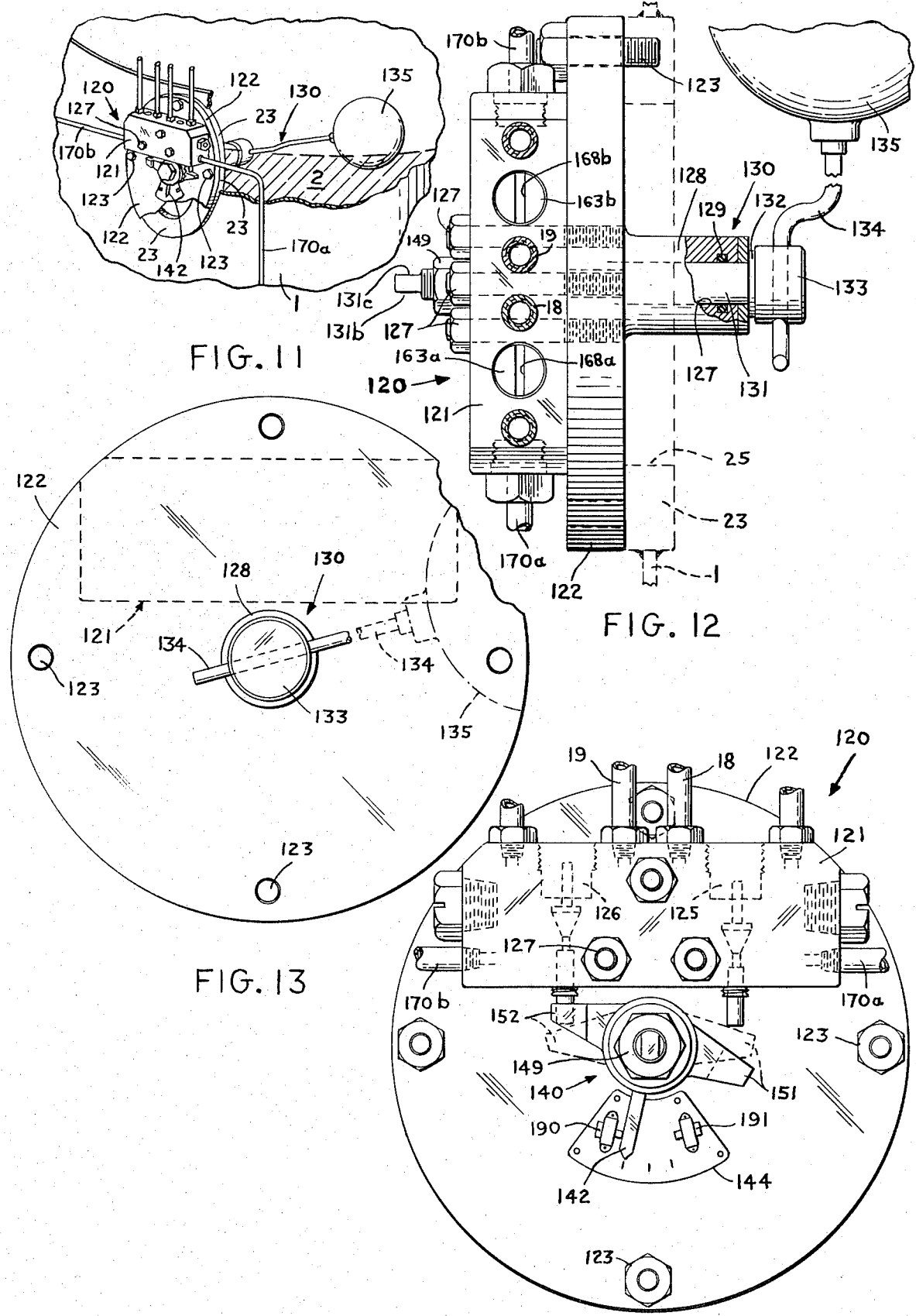

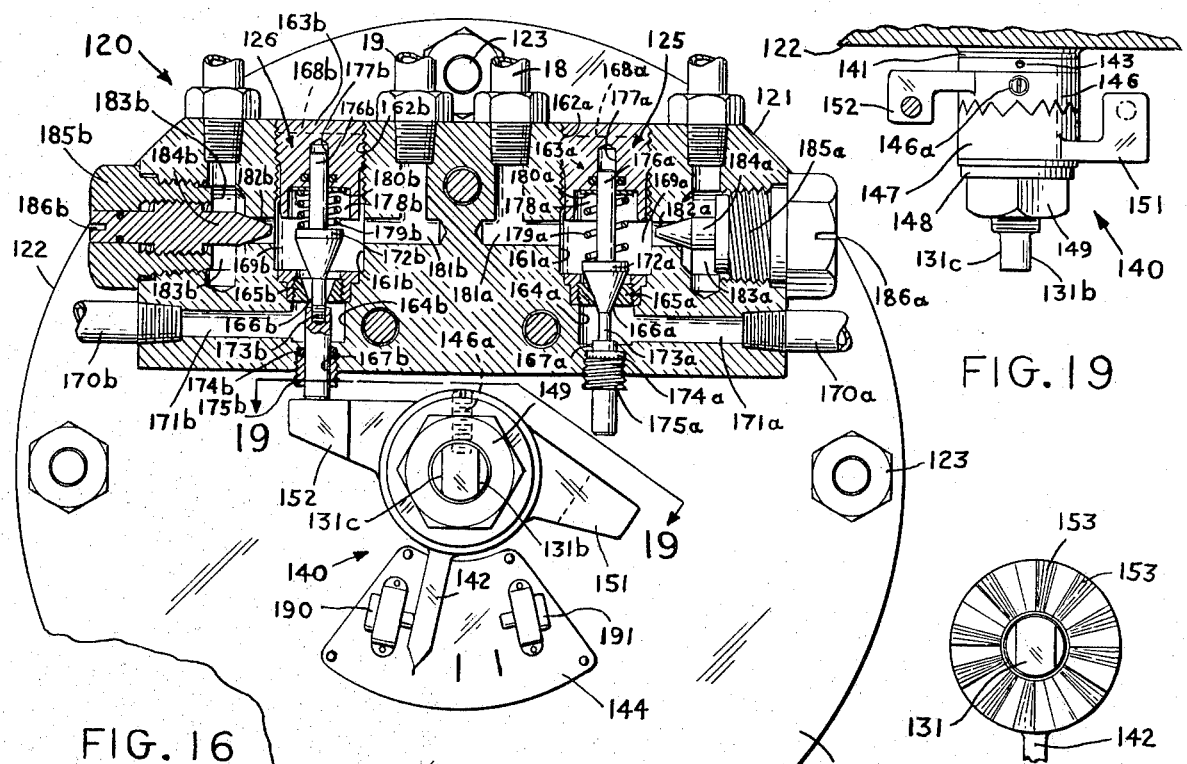

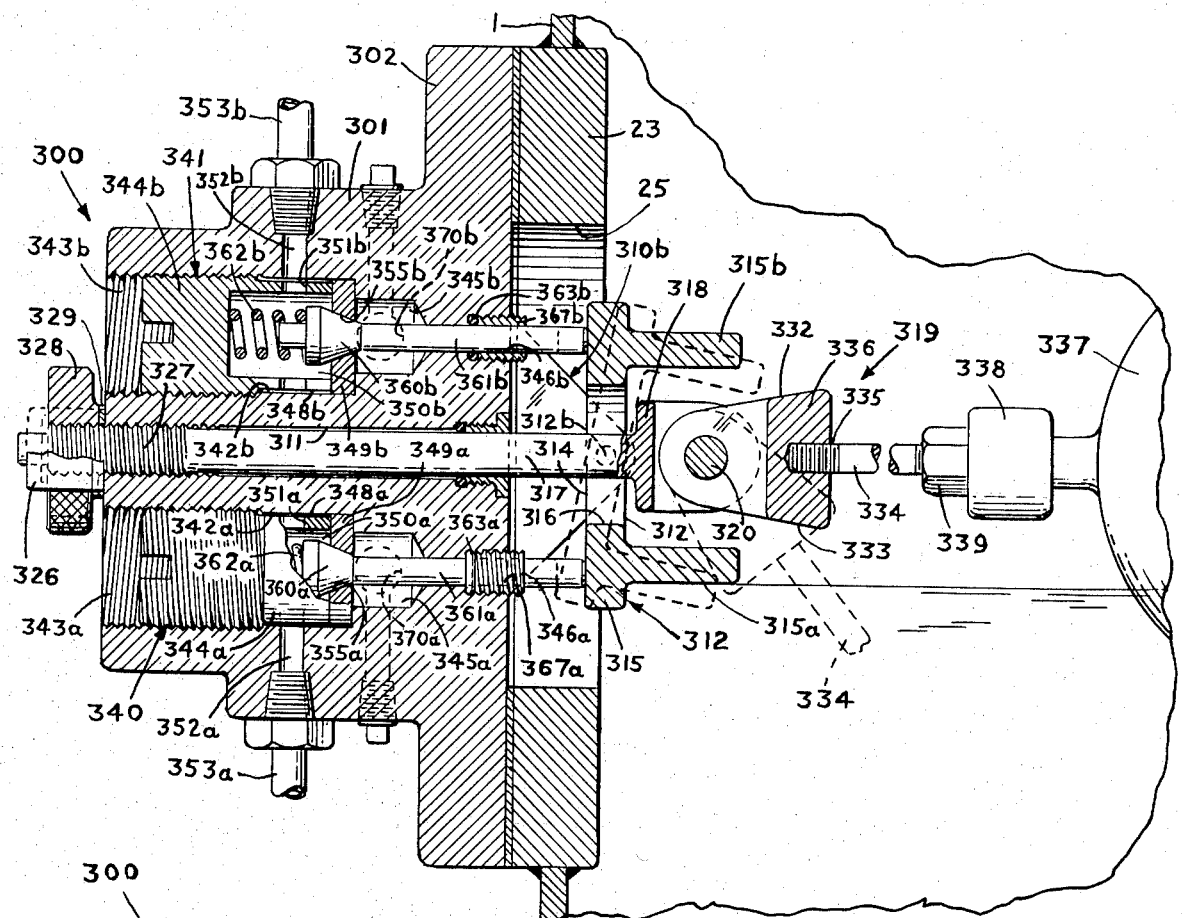
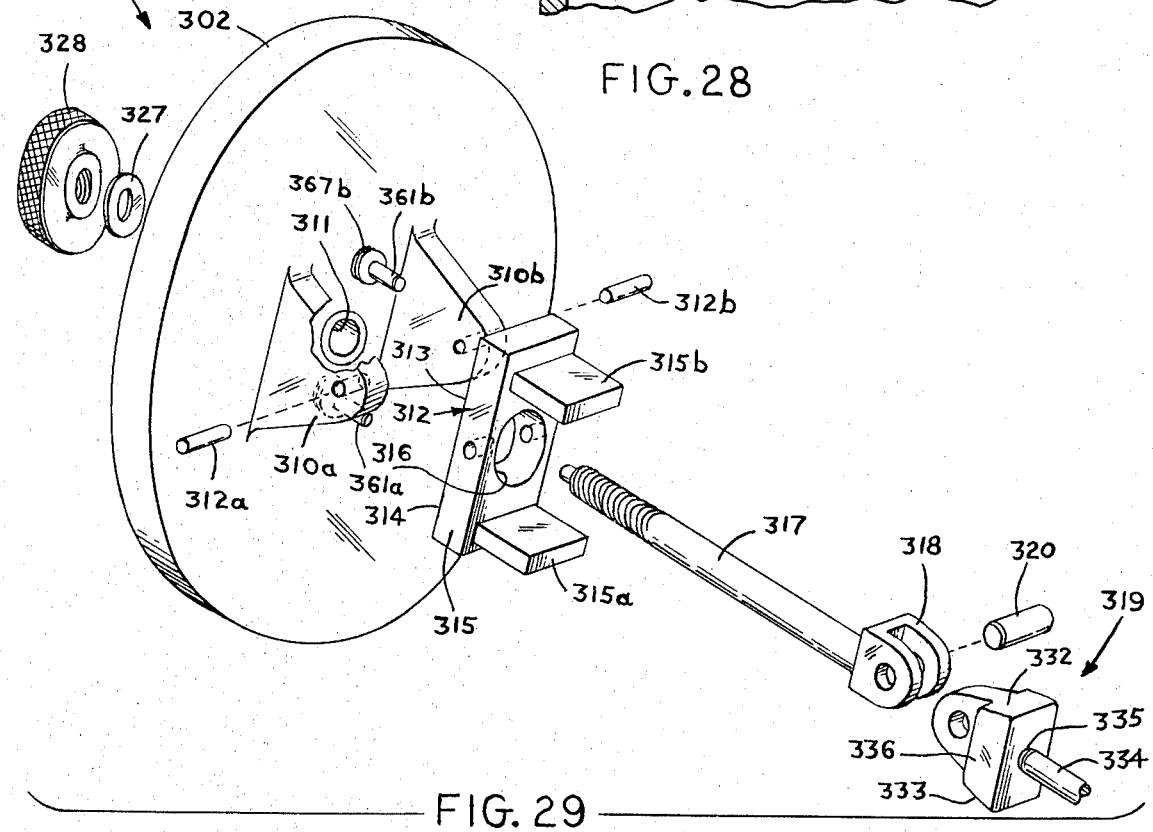

FLUID LEVEL CONTROL SYSTEM AND FLUID LEVEL ACTUATED CONTROLLER THEREFOR

BACKGROUND OF THE INVENTION

This invention relates generally to fluid level actuated control systems for monitoring and controlling the level of fluid in reservoirs, process fluid supply systems, deaerating systems, boiler feed systems and the like apparatus and more particularly to a fluid level actuated control system for monitoring the level of fluid in a vacuum, atmospheric or pressurized reservoir utilizing a fluid level actuated controller having one or more pilot valve assemblies capable of sending a modulated signal to one or more control valves, each performing different functions at the same time or selectively responsive at different times for performing the same or different functions as determined by the level of the fluid being monitored.

It is known in the prior art that the level of fluid in a reservoir or other processed fluid system can be controlled and regulated by separate control valves, each receiving a signal from an associated individual controller which operates the control valve as a function of the level of the fluid in the system.

Many of the liquid level systems utilize a mechanical controller of the on-off type in which the process fluid is passed directly through the controller to the tank or reservoir in which the fluid is stored. Such controllers produce surging of the fluid particularly in the fill position and in the absence of means to modulate the action of the controller overfill or overdrain the process fluid.

The present system operates the control valves separately and independently from each other by means of a single controller having one or more independent pilot valve assemblies each operatively associated with a particular control valve for signalling the operation thereof. The pilot valve assemblies can be adjusted individually within a given range of operation so as to transmit modulated signals to an associated control valve to meet the varying requirements of the system.

The modulated signals delivered by the pilot valve assemblies results in longer control valve life and facilitates operation of the system in that the change in the process fluid in the tank or reservoir is gradual, thus eliminating the rapid surging of fluid during filling or drawing and the problems of overfilling and overdrawing of process fluid.

The fluid level actuated controller for the present system includes, conventional flange means to facilitate each installation thereof on the process fluid tank or reservoir and is adapted for use with any suitable type of fluid level responsive means which can be connected for operative association with the pilot valve assemblies in the controller.

Means on the controller external of the process fluid system or reservoir to which the controller is attached is provided to adjust the level of the fluid within the predetermined maximum and predetermined minimum limits of the level band adjustment range for the given controller.

SUMMARY OF THE INVENTION

A fluid level control arrangement for maintaining process fluid in a reservoir between predetermined minimum and maximum levels includes, an inlet line for passing process fluid to the reservoir, and an outlet line for removing process fluid from the reservoir and respectively, a fluid actuated fill valve in the inlet line and a fluid actuated drain valve in the outlet line for passing fluid to or removing fluid from the tank, and a fluid level actuated controller having at least or or more pilot assemblies for sending one or more modulated signals to an associated fill valve or drain valve to actuate alternatively, selectively or simultaneously one or the other of said valves or both to maintain the level of process fluid in the reservoir between the predetermined minimum and maximum limits.

Additionally, a fluid level actuated controller including, a valve body, means for mounting the valve body, at least one pilot valve assembly in said valve body to control the flow of signal fluid therethrough, means for connecting said pilot valve assembly to a device to be operated by said signal fluid, each of said pilot valve assemblies including, valve stem means, means to vary the fluid signal delivered as the pilot valve is actuated from the closed to the open position, and means for maintaining each of said pilot valve assemblies normally closed; means for operating each of said valve stem means to actuate said pilot valve assemblies to open position, and adjustable means to vary the actuation of one or more of said pilot valve assemblies to the open position.

OBJECTS AND ADVANTAGES

Accordingly, it is an object of the present invention to provide a system for monitoring the fluid level in a reservoir or tank having a fluid level actuated controller for sending a plurality of modulated signals for controlling individually one or more control valves doing similar or different functions simultaneously or independently of each other.

It is another object of the present invention to provide a fluid level actuated controller having the versatility and accuracy of the standard displacement liquid level controller with a plurality of valving assemblies each having complete and separate means to adjust the valving assembly independently of any other valving assembly in the fluid level actuated controller.

It is another object of the present invention to provide a fluid level actuated controller which contains at least one or more separate pilot valve assemblies each respectively having means thereon to adjust the response time.

It is another object of the present invention to provide a fluid level actuated controller having a plurality of pilot valve assemblies wherein each of the pilot valve assemblies have adjustable means for changing the relative open and closed position so that associated control valve elements can be utilized to adjust the level of process fluid in a reservoir or tank.

These and other objects of the invention will become clear to those skilled in the art when the description herein is considered in connection with the following drawings, in which:

FIG. 11 is a schematic drawing of a fragment of a process fluid reservoir showing a portion of a fluid level control system mounted thereon similar to that shown in FIG. 1 having another form of fluid level actuated controller.

FIG. 12 is a top plan view of the fluid level actuated controller shown in FIG. 11.

FIG. 13 is a front view of the fluid level actuated controller shown in FIG. 11.

FIG. 14 is a rear view of the fluid actuated controller shown in FIG. 11.

FIG. 15 is a right side view of the fluid actuated controller shown in FIG. 11.

FIG. 16 is a cross-section taken on line 16—16 of FIG. 15.

FIG. 17 is an exploded view of the lever arms and pointer of the rotary actuated mechanism shown in FIGS. 15 and 16.

FIG. 18 is a view taken on line 18—18 of FIG. 17.

FIG. 19 is a view of the lever arms and pointer of the rotary actuated mechanisms taken at line 19—19 of FIG. 16.

FIG. 28 is a cross-section taken on line 28—28 of FIG. 27.

FIG. 29 is an enlarged exploded view of the adjustment means and pivot means of the fluid level responsive means for the form of the invention shown in FIG. 22.

Figure 1:
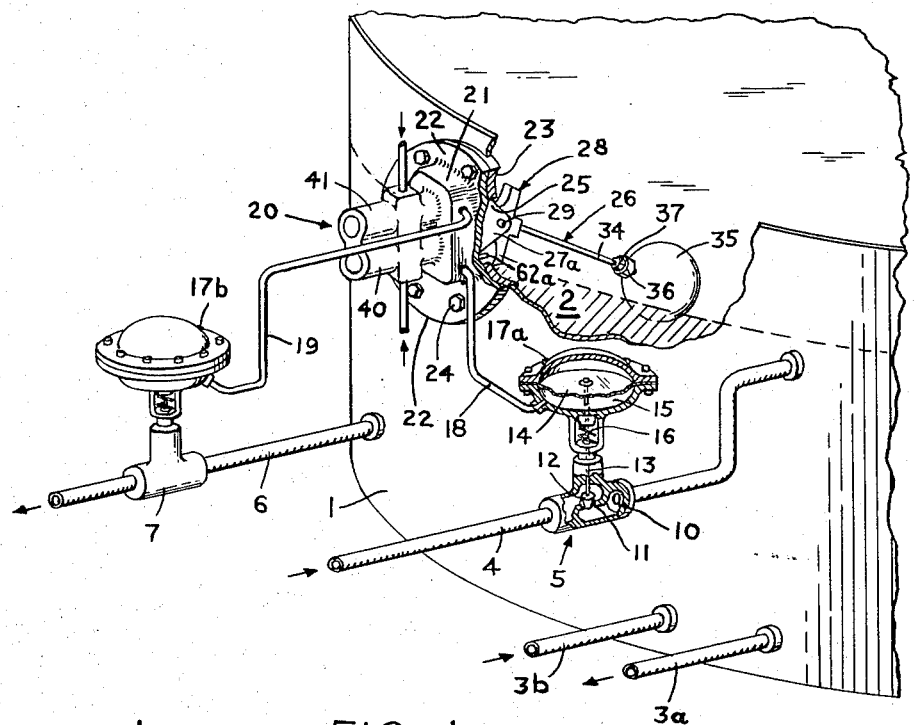
FIG. 1 is a schematic drawing of a process fluid reservoir showing a fluid level control system mounted thereon with a fluid level actuated controller.

Referring to the drawings, FIG. 1 shows a fluid reservoir or tank generally designated 1 having a process fluid 2 therein which is to be maintained between predetermined minimum and predetermined maximum levels.

The process fluid is drawn from and returned to the reservoir 1 through outlet pipe means generally designated 3a and return pipe means 3b.

Process fluid is delivered to the reservoir or tank 1 through the inlet line 4 and the flow of process fluid into the reservoir is regulated by the control valve 5 in the inlet line 4. Similarly, process fluid is drawn from the reservoir through the outlet line 6 and the control of the processed fluid being removed or drained from the reservoir 1 through outlet line 6 is regulated by the control valve 7 in outlet line 6.

In the illustrated form of the invention, the control valves 5 and 7 are shown to be identical diaphragm type motor control valves. Valves of this type may be operated with either air or some acceptable liquid and are well known and easily purchaseable on the open market.

Control valves of this type as illustrated at control valve 5 include, a valve body 10 having a valve port 11 therein. The valve body is connected in the fluid flow line such as line 4 to control the flow of process fluid from the upstream or source side through the port 11 to the downstream or use side of the system. Valve port 11 is opened and closed by means of a valve head 12 connected to a valve stem 13 which extends longitudinally of the valve body so that the end remote therefrom can be connected to a valve stem 13 which extends longitudinally of the valve body so that the end remote therefrom can be connected to the diaphragm member 14 of a diaphragm type motor which operates to actuate the valve stem so as to move the valve head into and out of engagement with the valve port for opening and closing the same.

The diaphragm type motor includes a supply pressure fluid chamber 15 on the side of the diaphragm which receives any suitable fluid for moving the diaphragm in accordance with signals furnished to the diaphragm type motor and a resilient means 16 for returning the diaphragm to its original position when pressure fluid is not acting in the pressure fluid chamber. The spring or resilient means 16 can be set to maintain the respective valve ports 11 normally open or normally closed as may be necessary for proper operation of the associated fluid flow system in which the control valves are connected.

While only one valve has been described and shown it is thought elementary and clear that the corresponding control valve 7 will have the same parts as has been described for control valve 5. Control valves of this type are well known and easily purchaseable on the open market and therefore they are not more fully described herein.

Supply or operating pressure fluid is delivered to the supply pressure fluid chambers 15 of the diaphragm type motors 17a and 17b on the respective control valves 5 and 7 through lines 18 and 19 and the delivery of supply pressure fluid independently, separately or simultaneously as the case may require is regulated by a fluid level actuated controller generally designated 20.

As will be understood by those skilled in the art control valves of the type illustrated will generally have alternate means for connecting the delivery line to the diaphragm type motor so that the control valves can be maintained either normally open or normally closed. Such control valves are shown and illustrated in U.s. Pat. No. 3,168,011.

Additionally, however, as will be more fully described below the controllers of the present invention are constructed and arranged so that instead of requiring a valve with a reversible connection to change the operation of the control valve from normally open to normally closed the disclosed controllers will provide different points of connection for the delivery lines to accomplish the same result.

PIVOT TYPE FLUID ACTUATED CONTROLLER

FIGS. 1 to 10 show one form of pivot type fluid level actuated controller designed to contain one or two separate pilot valve assemblies. In the form of the present invention illustrated two separate pilot valve assemblies are shown because it is in its capacity for controlling two control valves doing completely separate functions that the present invention provides its most advantageous application.

Thus, controller 20 is shown to include, a valve body 21 having an attachment or mounting flange 22 formed at one end thereof to provide means for connecting the controller 20 to an annular connecting ring 23 as by circumferentially spaced threaded means 24. The annular connecting ring forms an opening as at 25 in the side of the tank or reservoir 1 to permit a float assembly generally designated 26 to be passed therethrough during assembly of the control valve 20 to the connecting ring 23 all of which is clearly shown in FIGS. 1 and 2 of the drawings.

The front face of the attachment or mounting flange 22 includes a pair of spaced projections as at 27a and 27b and disposed between the projections 27a and 27b is a float pivot 28 which is mounted thereon for pivotal movement about an axis transverse to the longitudinal line of the valve body 21 by means of a clevis pin 29.

Figure 7:
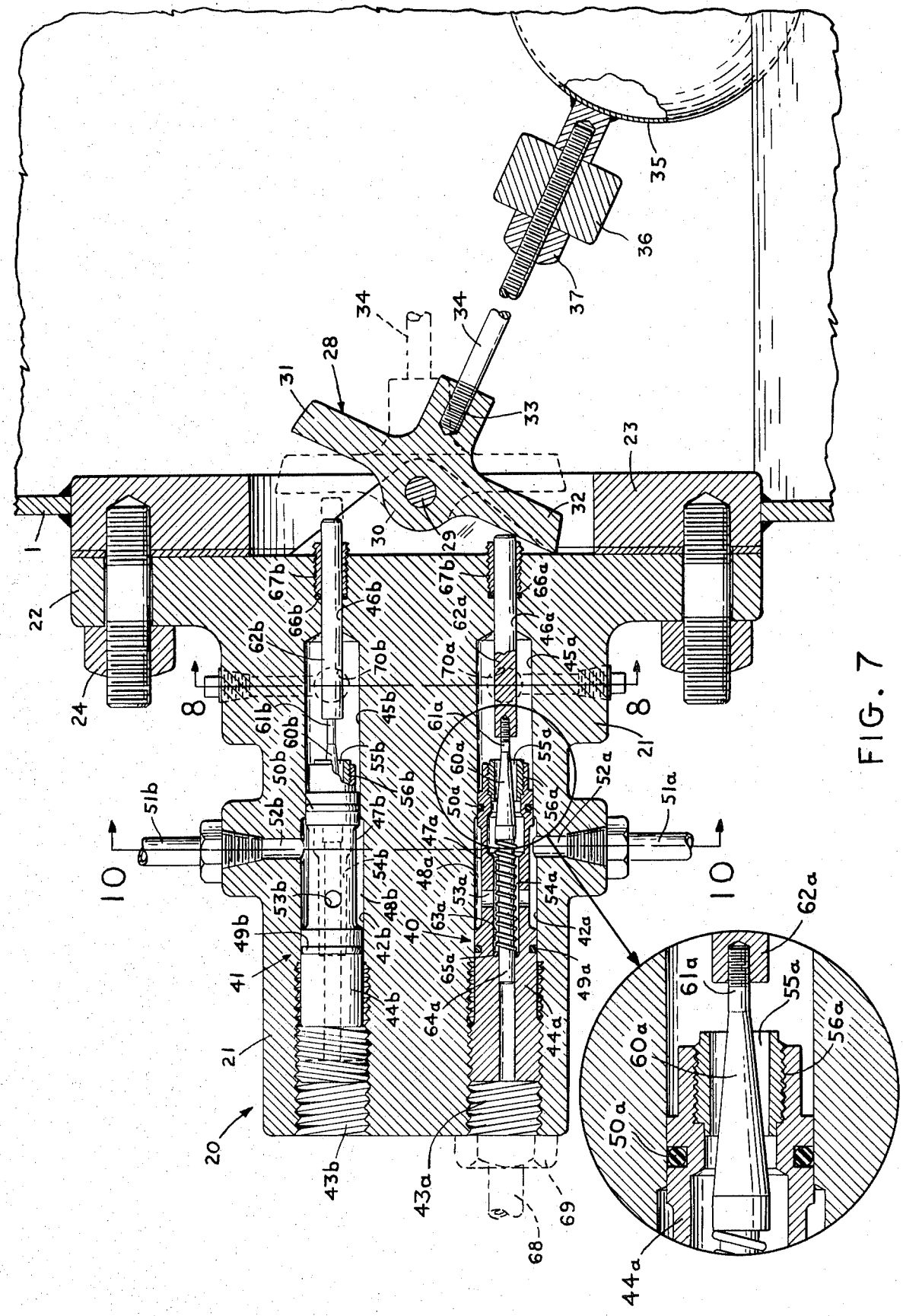
FIG. 7 is a cross-section taken at line 7—7 of FIG. 6.
Figure 8:
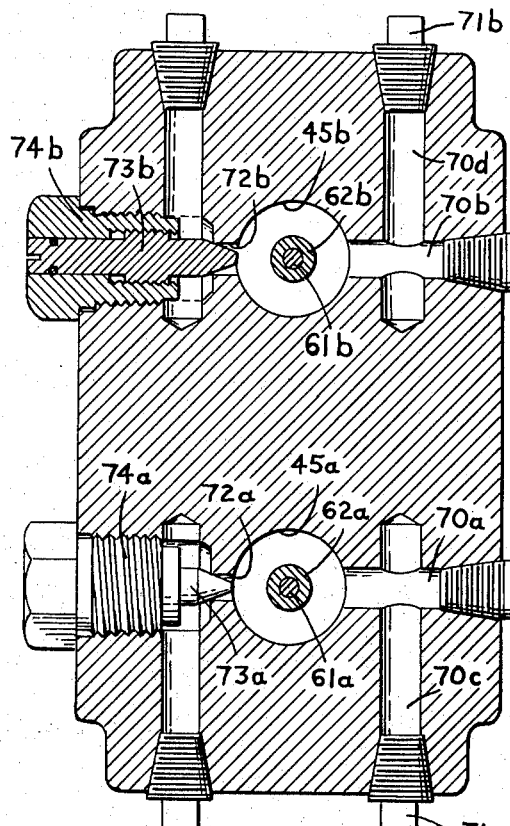
FIG. 8 is a cross-section taken at line 8—8 of FIG. 7.

In FIG. 7, the float pivot 28 has a hub portion 30 and laterally extending lever arm 31 and 32. The hub portion receives the clevis pin 29 therethrough so that when the clevis pin is rotatably connected by its respective ends in the projections 27a and 27b, the float pivot 28 can rotate about the axis formed by the clevis pin. Such pivotal travel will permit the float pivot 28 to engage and actuate the pilot valve assemblies generally designated 40 and 41 respectively as is more fully discussed hereinafter.

The hub is provided with a threaded bore 33 which receives one end of the float rod 34 which is an elongated member and in turn it receives at the end remote from the hub end, a float means 35.

A float ball weight 36 is held on the float rod 34 by means of a suitable lock nut 37. The float weight is desirable to vary the function of the float assembly 26 dependent on the specific gravity of the process fluid 2 in the reservoir or tank 1.

Figure 2:
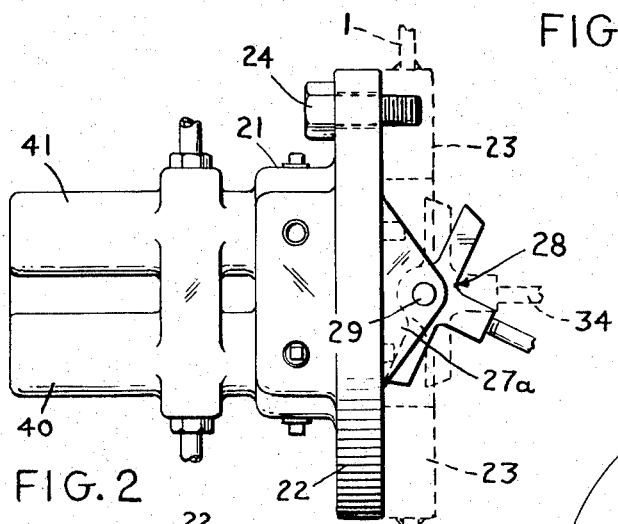
FIG. 2 is a right side view of the fluid level actuated controller shown in FIG. 1 with only a fragment of the fluid level responsive means illustrated.
Figure 3:
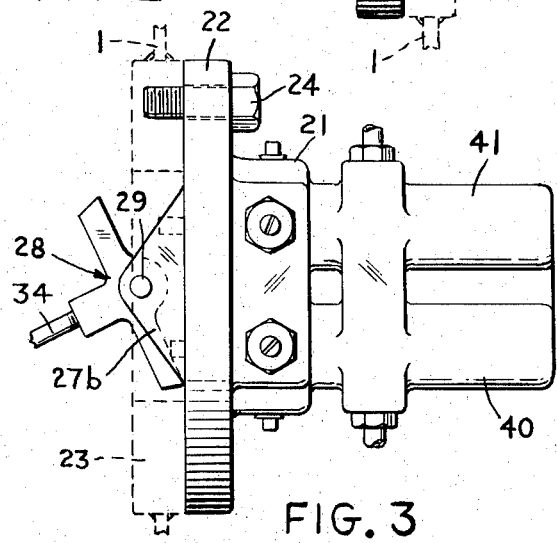
FIG. 3 is a left side view of the fluid level actuated controller shown in FIG. 1 with only a fragment of the fluid level responsive means illustrated.
Figure 4:
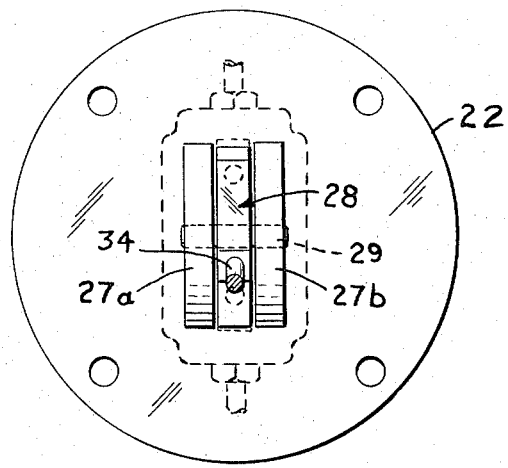
FIG. 4 is a front view of the fluid level actuated controller shown in FIG. 2.
Figure 5:
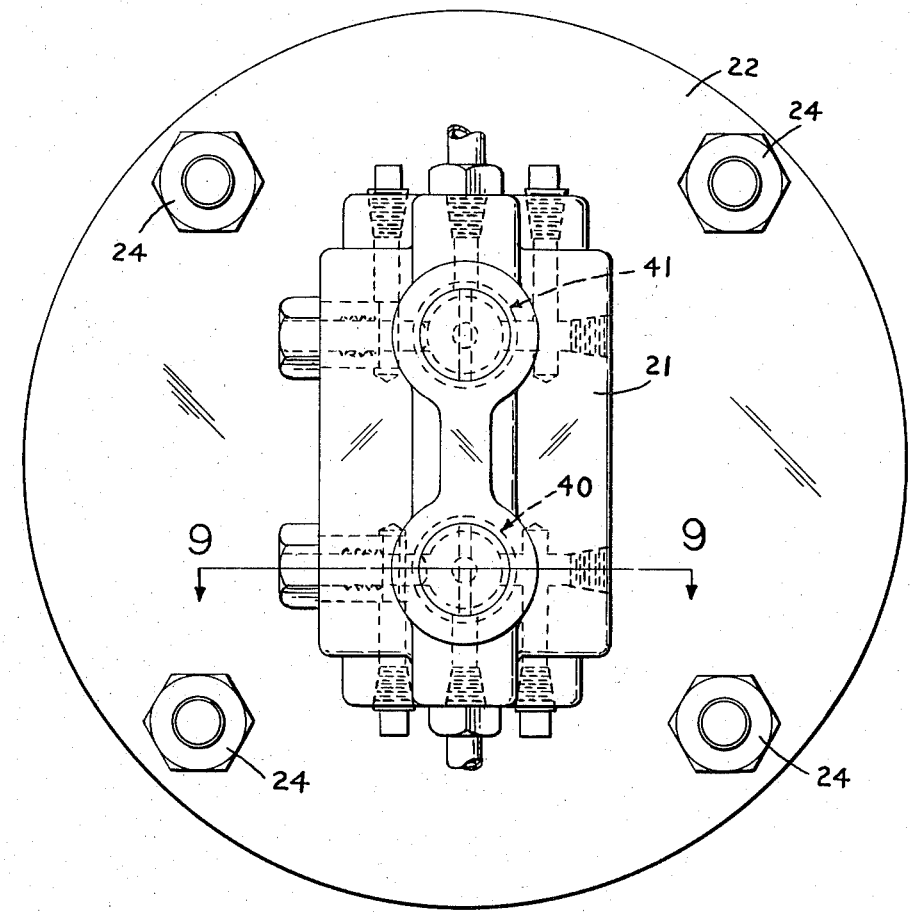
FIG. 5 is a rear view of the fluid level actuated controller shown in FIG. 2.
Figure 6:
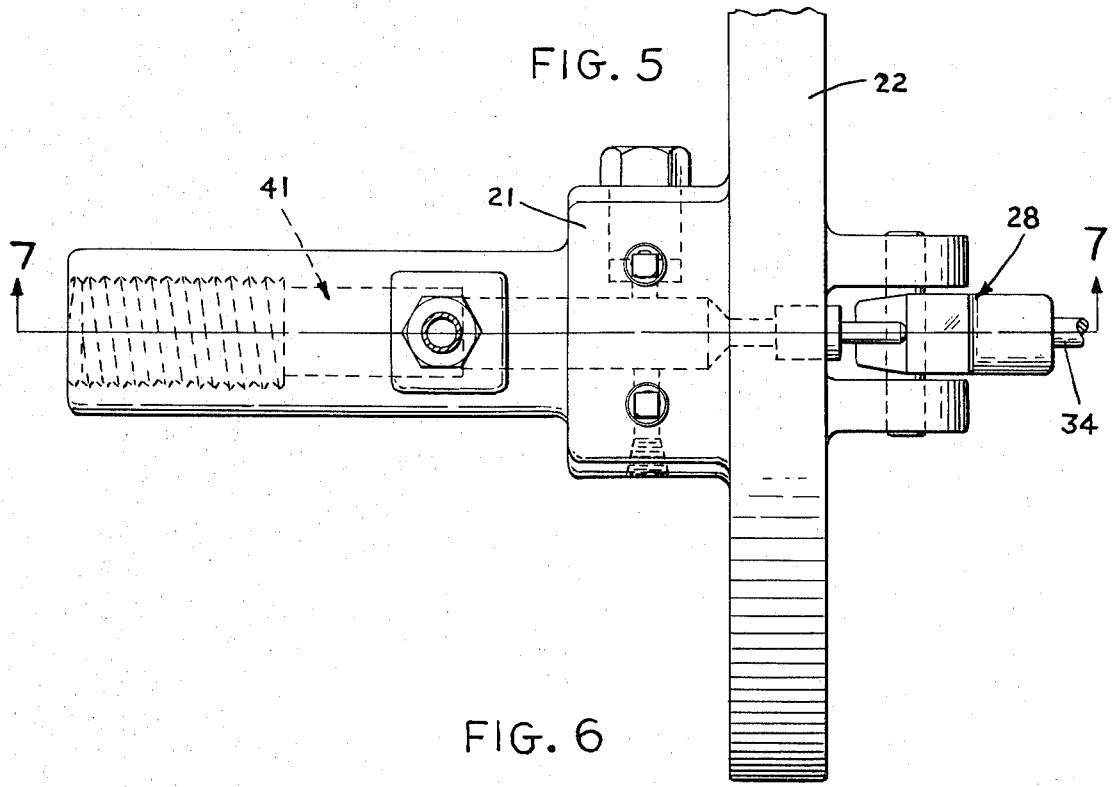
FIG. 6 is a top view of the fluid level actuated controller shown in FIG. 2.

The phantomized or dotted lines show the float pivot in the non-actuated position and the solid lines show the float pivot actuating one of the pilot valve assemblies 40 all of which is clearly shown in FIGS. 2 and 7 of the drawings.

Referring now to FIGS. 5 to 10 and more particularly to FIG. 7, the pilot valve assemblies 40 and 41 are shown as substantially identical in design. Accordingly, the same parts of each of the pilot valve assemblies will be given the same number but distinguished by a suitable character numeral, thus the pilot valve assembly 40 and 41 are shown as disposed in longitudinal bores 42a and 42b which extend inwardly along lines parallel to the center or longitudinal line of the valve body and open on the back or exterior end of the valve body 21.

The portions of the longitudinal bores 42a and 42b which open adjacent the rear or exterior end of the valve body 21 are threaded as at 43a and 43b to permit trim spools 44a and 44b to be threadably mounted therein so they may be moved longitudinally inward and outward to adjust the point at which each associated pilot valve makes contact with the pivot means 28 to initiate the modulated signal to the diaphragm motor of the respective control valves 5 and/or 7 as the case may be. This means for adjusting engagement permits the controller to establish the range within which the level of the process fluid will be maintained as will be clear from the operation of the system hereinafter more fully set forth.

Continuous with the longitudinal bores 42a and 42b and in alignment therewith, are counter bores 45a and 45b which are of lesser diameter than the longitudinal bores 42a and 42b. The ends of the counter bores 45a and 45b remote from the longitudinal bores 42a and 42b communicate in turn with valve stem guides 46a and 46b.

The trim spools 44a and 44b are cylindrical elements each having annular grooves as at 47a and 47b intermediate the ends thereof. When mounted in assembled position, these annular grooves 47a and 47b form with the inner wall of the respective longitudinal bores 42a and 42b in which the trip spools are mounted, annular fluid chambers 48a and 48b.

Fluid chambers 48a and 48b are maintained fluid tight by spaced "O" ring seals as at 49a and 49b on and about the trim spools adjacent the back end of the annular grooves where the respective diameters of the trip spools fit into the lingitudinal bores 42a and 42b and at 50a and 50b on and about the trim spools adjacent the front end of the annular grooves where the respective diameters fit the counter bores 45a and 45b.

In the system shown in FIGS. 1 to 10 of the drawings, pressure fluid will be delivered to the pilot valve assemblies from any suitable source at adequate pressure to insure proper operation of the disphragm type motors 17a and 17b through pressure fluid delivery lines 51a and 51b which are connected to the valve body 21 at the inlet ports 52a and 52b. Inlet ports 52a and 52b communicate with the pressure fluid chambers 48a and 48b formed by the trim spools in the longitudinal bores.

Trim spools 44a and 44b are further provided with a plurality of circumferentially spaced fluid passages as at 53a and 53b which communicate between the respective pressure fluid chambers 48a and 48b and the respective central passages 54a and 54b which extend from end to end in the respective trim spools 44a and 44b, all of which is shown in FIG. 7 of the drawings.

The central passages 54a and 54b communicate through valve ports 55a and 55b with the counter bore 45a and 45b. Valve ports 55a and 55b are formed in valve seat elements 56a and 56b threadably mounted in the front end of the respective trim spools 44a and 44b.

To control flow of pressure fluid from the central passages 54a and 54b to the counter bores 45a and 45b, valve heads 60a and 60b disposed for operative relation with the valve seat elements 56a and 56b.

FIG. 7 shows that the valve heads 60a and 60b are tapered so that the flow area through the valve ports may be varied as the valve heads are brought into and out of engagement with the valve seat elements 56a and 56b.

Valve heads 60a and 60b are mounted on valve stems 61a and 61b which are in turn connected to valve stem push rods 62a and 62b. The valve stem push rods extend through the valve stem guides 46a and 46b respectively so that the ends are disposed to engage one or the other of the lever arms 31 or 32 formed on float pivot 28.

Figure 9:
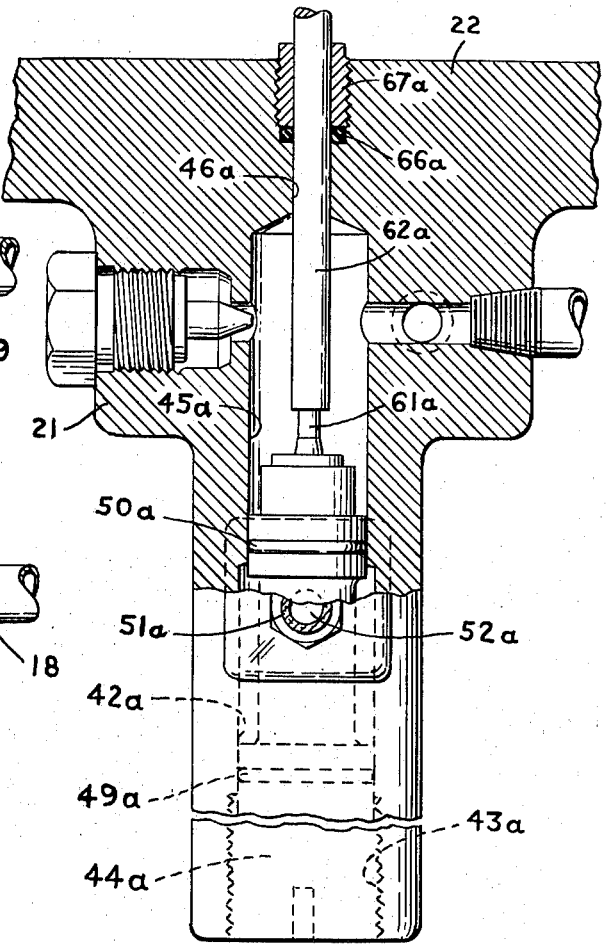
FIG. 9 is a cross-section taken at line 9—9 of FIG. 5.
Figure 10:
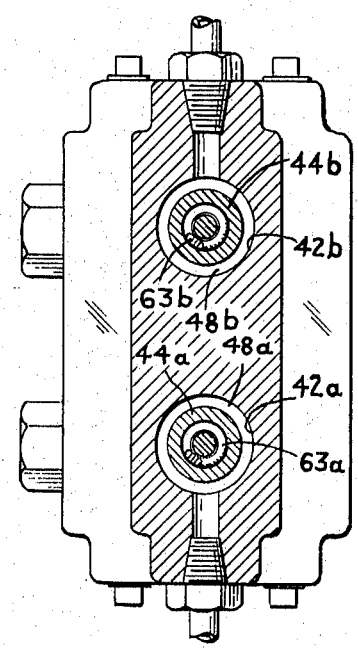
FIG. 10 is a cross-section taken at line 10—10 of FIG. 7.

The valve heads 60a and 60b are each held normally closed in the non-actuated position by resilient means such as the springs 63a and 63b which are mounted about the valve head extension 64a and 64b. The closed position is shown by the phantomized or dotted line position of the float pivot 32. "O" ring seals as at 65a and 65b are provided to prevent leakage from the central passages 54a and 54b of the pressure fluid acting therein, as is shown in FIGS. 7, 9 and 10 of the drawings.

Suitable "O" ring seals as at 66a and 66b and packing nuts as at 67a and 67b are provided to maintain a fluid tight seal about the valve stem push rods to prevent leakage of process fluid from the tank 1 to counter bores 45a and 45b.

In the form of the invention illustrated at FIG. 1, the process fluid 2 in tank 1 is under atmospheric conditions. The valve assemblies illustrated by reason of the uniform diameters of the valve stems 61a and 61b will have very small differential pressures acting on opposite sides of the valve heads 60a and 60b and accordingly require relatively light spring elements 63a and 63b thereon primarily to overcome the friction forces being exerted by "O" ring seals as at 65a and 65b and 66a and 66b.

Further, if the process fluid 2 in tank 1 is either under pressure or under a vacuum, this condition can be transmitted to the end of the valve assembly remote from the end in communication with the tank as by a line 68 and connecting element or nut 69 as shown by the phantomized lines on FIG. 7 from the tank 1 to the valve assembly 40.

In operation, when the float pivot 28 is rotated so that either lever arm 31 or 32 is brought into engagement with the valve stem push rods 62a or 62b these rods respectively on contact will be moved in a rearward direction which will cause the tapered valve heads 60a and 60b respectively as the case may be to lift off the valve seat element 56a and 56b so as to progressively expose a greater area of the valve port for passing fluid from the central passages 54a and 54b through the valve ports 55a and 55b to the counter bores 45a and 45b.

This arrangement provides a variable orifice for the control fluid which will be used to operate the diaphragm type motor of the respective control valves 5 and 7.

The pressure fluid for operating the diaphragm type motor for the control valve will be passed from the counter bores 45a and 45b through a suitable outlet passage as at 70a and 70b which is connected to the delivery lines 18 and 19. Since the delivery lines 18 and 19 are connected to the diaphragm type motors 17a and 17b of the respective control valves 5 and 7, when either of the pilot valve assemblies 40 and 41 are actuated to open position pressure fluid delivered to the counter bores 45a and 45b will be passed to one or the other of the diaphragm type motors 17a or 17b to actuate either control valve 5 or control valve 7 as may be required.

The delivery lines can be connected to outlet 70c or 70d by reversing the plugs 71a and 71b and the lines 18 and 19 respectively.

In order to regulate the rate at which air is delivered to the diaphragm type motors 17a or 17b of the resepctive control valves 5 and 7, bleed passages are provided as at 72a and 72b for the respective counter bores 45a and 45b. Bleed screws 73a and 73b threadably mounted in bleed screw bushings 74a and 74b disposed in the valve body 21 are in operative engagement with the bleed passages 72a and 72b. By rotating bleed screws 73a and 73b the rate at which air is passed to the diaphragm type motors 17a and 17b can be controlled.

By adjusting the bleed screws 73a or 73b, means are provided to regulate now long it will take the pressure fluid to actuate and modulate the control valves 5 and 7 from their normally closed position to a given open position depending on the signal.

The actual level of the process fluid which is being controlled can be regulated by adjusting the trim spools 44a and 44b either in or out. Such movement adjusts the valve stem push rods so they are closer or further from the respective lever arms 31 and 32, as is indicated by the phantomized or dotted lines on the pilot valve assembly 40 and its associated trim spool 44a. For example, if it is desired to lower the fluid level in the tank or reservoir 1 trim spool 44a is turned so that it is moved outwardly. This will cause the float assembly 26 to travel more before it begins to enage and push on the valve stem push rod 62a of the pilot valve assembly 40.

Thus, the above arrangement permits a modulated signal to be passed to the diaphragm type motors of the control valve.

The bleed valves for the pilot assemblies act as waste valves to unload the diaphragm type motors to permit the springs to return the control valves to their normally closed positions.

It will be understood by those skilled in the art that the control valves can be operated in normally open positions and modulated to the closed positions by mere reversal of the service fluid lines 51a and 51b and the signal fluid delivery lines 18 and 19. When this is done the operation of the pilot valve assemblies will be the same as above described but the flow therethrough will be reversed.

OPERATION PIVOT TYPE CONTROLLER

In the form of the invention shown in FIG. 1 pilot valve assembly 40 operates and actuates the fill valve 5 and pilot valve assembly 41 operates and actuates the drain valve 7.

Trim spools 44a and 44b are given a preliminary adjustment and the system will be placed in operation by opening a valve (not shown) to permit process fluid to pass through the inlet line 4 to the fill valve 5. Since the reservoir is empty the float assembly 26 will be signalling for complete fill action by the fill valve. Thus, the float pivot will move the valve stem push rod 62a so that the valve head 60a will be in the full open position. Pressure fluid will flow from the pressure line 51a through the fluid pressure inlet 52a to the fluid pressure chamber 48a. From fluid pressure chamber 48a, it will pass through fluid passages 53a into the central passage 54a and thence through the valve port 55a counter bore 45a, and outlet 71a and delivery line 18 to the diaphragm type motor 17a of the control valve 5 and will actuate the same to open position all of which is clearly shown in FIGS. 7 to 10 of the drawings.

The tank or reservoir 1 will fill with process fluid until the float 35 moves the float pivot 28 out of engagement with the valve stem push rod 62a. Then the resilient means 63a will move the valve head 60a into engagement with valve seat element to close the pilot valve assembly 40.

If, however, the process fluid delivered to the tank or reservoir 1 causes the float 35 to rise above to the predetermined maximum level then the float pivot 28 will pivot so that the lever arm 31 will engage the valve stem push rod 62b of the pilot valve assembly 41. This will gradually move the valve head 60b so as to uncover the valve port 55b and fluid pressure will then pass from the pressure line 51b through the various ports and passages as above described to the pressure fluid delivery line 19 which pressure fluid will act to actuate the diaphragm type motor 17a and 17b of the drain valve 7 and thus prevent the process fluid from exceeding the predetermined maximum level for which the controller is set.

The system will continue to operate as process fluid is drained from the system through the outlet 3 and delivered by the fill valve 5 to the tank or reservoir 1.

ROTARY TYPE CONTROLLER

In the form of the invention shown in FIGS. 1 to 10 of the drawings, the fluid level actuated controller is operated by an associated pivot type float assembly.

In the form of the invention shown in FIGS. 11 to 19 a rotary type fluid level actuated controller is illustrated.

Since this controller operates in the same fashion as that of the controller shown in FIGS. 1 to 10 of the drawings, it is not deemed necessary to describe the details of the system shown in FIG. 1.

Thus, referring to FIG. 11 only a fragment of the tank 1 and its system is shown having a rotary type fluid level actuated controller 120 mounted thereon.

FIGS. 12 to 16 show that the rotary type fluid level actuated controller 120 includes a valve body 121 which is fixedly connected to a mounting flange 122.

Mounting flange 122 has a plurality of circumferentially spaced openings which provide means for connecting the controller 120 as by threaded members 123 onto the connecting ring 23 in the side of tank 1.

The connecting ring 23 is provided with an access opening 25 which permits a float assembly generally designated 130 operatively associated with the controller 120 to extend into the tank 1 for engagement with process fluid 2 stored or collected therein.

Valve body 121 is a recti-linear member which includes one or more pilot valve assemblies and can be connected as by threaded means 124 to the mounting flange 122 or can be formed integrally therewith as will be understood by those skilled in the art. The valve body 121 lies in the upper section of the mounting flange 122 above the centrally disposed bore 127. The centrally disposed bore 127 extends through the mounting flange and an elongated boss 128 to provide means for rotatably mounting operating shaft 131 of the float assembly 130. "O" ring 129 is provided to prevent leakage of process fluid 2 in tank 1 along the operating shaft 131.

The operating shaft and other elements of the float assembly 130 are constructed and arranged for operative association with the pilot valve assemblies 125 and 126 in the valve body 121 as is shown in FIGS. 13, 14, 15 and 16 now to be described in more detail.

Thus, referring to FIGS. 13, 14 and 15 the operating shaft 131 is shown as extending beyond each end of the centrally disposed bore 127. At the end of the bore which opens on the face of the elongated boss 128 the operating shaft 131 extends into the tank 1 where it receives a washer 132 and an end cap 133. The end cap 133 may be threaded or fixedly connected to this inner end of the operating shaft by any suitable means.

A goose neck float arm 134 is connected at one end to end cap 133 and at the end remote therefrom to float means 135 which is mounted thereon as by threaded or other suitable means. The float arm 134 is shaped to move the float 135 away from the inner wall of the tank 1 so that the float arm 134 and operating shaft 131 will rotate freely as the float rises and falls with the level of the process fluid 2 in the tank 1.

At the end of the operating shaft 131 remote from the end connected to the float arm, the operating shaft extends outwardly of the exterior face of the controller 120 a substantial distance as shown in FIG. 15 where it receives the cam assembly generally designated 140 for operating the pilot valve assemblies 125 and 126.

In FIGS. 14 and 15, the cam assembly 140 is shown as including a washer 141 which serves as a bearing surface for an indicating member or pointer 142 which is affixed to the operating shaft by any suitable means such as a set screw 143. The indicating member 142 extends downwardly so that rotational movement of the operating shaft can be measured by the movement of the indicating member 142 across the scale means 144 which is disposed on the rear face of the mounting flange 122 for operative association with the indicating member or pointer 142, as shown in FIGS. 14, 15 and 16 of the drawings.

Actuating arms or cam levers 146 and 147 are connected about the outer extended portion of the operating shaft 131 by means of a lock washer 148 and a lock nut 149 which act to hold the actuating arms or cam levers 146 and 147 in their adjusted positions against the shoulder 131a on the shaft 131. A set screw 146a will hold the actuating arm 146 in adjusted position and this will also act to hold actuating arm 147 in assembled position because of the interengaging elements thereon now to be described.

Thus, FIGS. 17, 18 and 19 show that the actuating arms 146 and 147 each include, a hub means as at 149 and 150 having a bore therethrough which permits the actuating arms to be mounted on the operating shaft 131, and outwardly extending lever arms as at 151 and 152. As can be seen at FIG. 16, the lever arms 151 and 152 will have sufficient length for engaging and actuating the pilot valve assemblies 125 and 126, as the operating shaft 131 of the float assembly is rotated by the rise and fall of the float 135 with changes in the level of the process fluid 2.

When such rotation occurs, then depending on the direction of rotation one or the other of the lever arms will engage and actuate their associated pilot valve assemblies 125 and 126 as hereinafter described.

With reference to FIGS. 15 and 17, one means for adjusting the relative positions of the actuating arms or cam levers 146 and 147 is shown to include interengaging teeth on the adjacent faces of the actuating arms as at 153 on actuating arm 146 and 154 on actuating arm 147. When it is desired to adjust the relative position of the actuating arms 146 and 147, the lock nut 149 and set screw 146a are loosened sufficiently to disengage the teeth 153 from 154. The position of the respective lever arms 146 and 147 is then changed and the teeth are re-engaged and again locked in position by means of the set screw 146a and lock nut 149 by holding flats 131b and 131c on shaft 131 tightly until the set screw 146a and lock nut 149 are set as is shown in FIGS. 16 and 17.

Other techniques such as splines, not shown, on the end of the operating shaft with corresponding teeth, now shown, for engagement therewith in the hubs of the actuating arms 146 and 147 or key means etc. may be used for this purpose without departing from the scope of the present invention.

In operation, as the float 135 rises and falls with the level of the process fluid 2, it will cause the operating shaft 131 to rotate either clockwise or counterclockwise. This will rotate the actuating arms 146 and 147 about the axis of the operating shaft 131. In turn, a lever arm 151 or 152 on one of the other of the actuating arms 146 and 147 will respectively engage one or the other of the pilot valve assemblies generally designated 125 and 126 in the valve body 121 as is shown in FIGS. 15 and 16.

With reference to FIG. 16, the pilot valve assemblies 125 and 126 in the valve body 121 are shown to be substantially identical in design. Accordingly, the same parts on each of these pilot valve assemblies will be given the same number but distinguished by suitable character letters in a manner similar to the above description of the parts of the pilot valve assemblies 40 and 41 of controller 20 shown in FIGS. 1 to 10 of the drawings and above described.

Thus, pilot valve assemblies 125 and 126 are disposed in bores 161a and 161b which extend inwardly from the upper surface of the valve body 121 along lines parallel to each other but on opposite sides of the center or longitudinal line of the valve body 121.

The portions of the bores 161a and 161b which open adjacent to the upper or exterior face of the valve body 121 are threaded as at 162a and 162b to permit trim spools 163a and 163b to be threadably mounted therein so they may be moved along the respective longitudinal axis of the bores 161a and 161b.

Continuous with the bores 161a and 161b and in alignment therewith are counter bores 164a and 164b and at the point where the bores and counter bores communicate with each other valve seat means or elements as at 165a and 165b are provided. The valve seat means 165a and 165b have respectively therethrough valve ports 166a and 166b to provide flow passages between the associated bore 161a and counter bore 164a and bore 161b and counter bore 164b.

At the end of the respective counter bores 164a and 164b remote from the bores 161a and 161b and in the longitudinal line thereof, valve stem guide openings 167a and 167b are formed which communicate at one end with the counter bores 164a and 164b and at the other end open at the lower exterior surface of the valve body 121.

The trim spools 163a and 163b are cylindrical elements and in assembled position are accessible at the upper or exterior surface of the valve body 121. Slots as at 168a and 168b are formed in the exterior face of the trim spools so that an ordinary screwdriver can be utilized to thread the trim spools 163a and 163b into and out of the vertical bores 161a and 161b for adjusting the operation of their associated pilot valve assemblies as is hereinafter described.

The trim spools in assembled position in the bores 161a and 161b form supply pressure fluid chambers as at 169a and 169b in the respective pilot valve assemblies.

Supply or control pressure fluid will be delivered to the respective pilot valve assembles from any suitable source, at adequate pressure to insure proper operation of the diaphragm type motors 17a and 17b through pressure fluid delivery lines 170a and 170b which are connected to the valve body 121 at one end of the inlet ports 171a and 171b which communicate with the main supply pressure fluid chambers formed by the counter bores 164a and 164b.

To control the flow of pressure fluid, from the main supply pressure fluid chambers formed by counter bores 164a and 164b through the valve ports 166a and 166b to the central pressure fluid chambers 169a and 169b valve heads 172a and 172b are disposed in the respective pilot valve assemblies 125 and 126 for operative relation with the valve seat elements 165a and 165b in these assemblies.

The valve heads 172a and 172b are tapered as shown in FIGS. 16 to provide a more sensitive and uniform modulation of the signal or control pressure fluid passing through the associated valve ports 166a and 166b when either of said valve heads are actuated to the open position.

Valve heads 172a and 172b are mounted at intermediate points on their respective valve stems 173a and 173b which lie in the longitudinal line of the bores 161a and 161b and of the pilot valve assemblies. The lower portions of the valve stem are disposed respectively to extend through the valve ports 166a and 166b and through the valve stem guide openings 167a and 167b so that the respective lower ends of the valve stems 173a and 173b extend beyond the lower surface of the valve body 121 for engagement with the lever arms 151 and 152 on the actuating arms or cam levers 146 and 147.

At the point where the valve stems 173a and 173b extend through the valve stem guide openings a fluid tight seal is provided by the "O" rings 174a and 174b and packing nuts 175a and 175b, as is shown at FIGS. 14 and 16 of the drawings.

On the side of the valve heads 172a and 172b remote from the valve ports, the valve stems form valve stem extension 176a and 176b which is slidably disposed respectively in a central bore formed at 177a in the trim spool 163a and at 177b in the trim spool 163b. A counter sunk opening as at 178a and 178b formed in the respective trim spools 163a and 163b remote from the exterior end will permit valve return springs 179a and 179b so that they engage the respective valve heads 172a and 172b at one end and shoulders 180a and 180b formed by the counter sunk openings 178a and 178b at the opposite end.

The valve heads 172a and 172b are each held normally closed in the non-actuated position; as shown by the phantomized or dotted lines of the actuating arms of the float assembly; by the resilient elements or spring means 179a and 179b. When the actuating arms 151 and 152 engage the associated valve stems 173a or 173b, as the case may be, so as to lift the valve heads 172a and 172b out of engagement with the associated valve seats 165a and 165b a pilot valve will be actuated to open position and the resilient means or spring 179a and 179b will be compressed. Conversely, when the actuating arms 151 or 152 move out of engagement with the respective valve stems 173a and 173b, the compressed springs 179a and 179b will expand to again force the valve heads 172a and 172b into engagement with the associated valve seat elements 165a and 165b to return the open pilot valve assemblies to its normally closed position.

When the pilot valve assemblies are actuated to open position pressure fluid will pass from the main control pressure fluid chambers formed by the counter bores 164a and 164b through the valve ports 166a and 166b to the signal pressure fluid chambers 169a and 169b of the pilot valve assemblies.

The pressure fluid for operating the diaphragm type motors for the control valves 5 or 7 will be passed from the signal pressure fluid chambers 169a and 169b through suitable outlet passages as at 181a and 181b to the delivery lines 18 and 19 which are connected to the valve body 121 for communication with the outlet passages, as is shown in FIGS. 11 and 16 of the drawings.

Since the delivery lines 18 and 19 are connected to the diaphragm type motors 17a and 17b of the control valves 5 and 7 when the pilot valve assemblies 125 or 126 are actuated to open position pressure fluid delivered to the pressure fluid chambers formed by the counter bores 164a or 164b will be passed through one or the other of the valve ports and the associated signal or control pressure fluid chambers to one or the other of diaphragm type motors 17a or 17b to actuate either fill valve 5 or drain valve 7 as the level of the process fluid 2 in tank 1 may require.

In order to regulate the rate at which air is delivered to the diaphragm type motors 17a or 17b of the respective control valves 5 and 7, bleed passages are provided as at 182a and 182b for the respective signal or control pressure fluid chambers 169a and 169b. Bleed passages 182a and 182b are in communication with outlet or waste ports as at 183a and 183b and bleed screws 184a and 184b are provided for regulating the area of the opening in the bleed passages to control the rate at which air will bleed from the signal or control pressure fluid chambers 169a and 169b. The bleed screws are threadably mounted in bleed screw bushings 185a and 185b in the valve body 121 which is disposed so that the respective bleed screws 184a and 184b in assembled position may be threaded into or out of the bleed passages 182a or 182b by means of a screwdriver which engages the slot 186a and 186b disposed on the exterior of the bleed screws 184a as is shown in FIG. 16 of the drawings.

Since the bleed passages 182a and 182b are in communication communication with the waste ports 183a and 183b a given volume of signal pressure fluid will escape depending on the adjustment of the bleed screws. This in turn will control the rate at which signal pressure fluid, i.e., air or liquid, is delivered or passed through the delivery lines 18 or 19 to one or the other of the diaphragm type motors 17a or 17b of the control valve 5 or 7 when the system is in operation.

Conversely, when one or the other of the pilot valve assemblies are deactuated or moved to the closed position, since the diaphragm type motors 17a or 17b are in free communication with their respective bleed passages 182a and 182b and the associated waste ports 183a and 183b, signal pressure fluid acting in the diaphragm type motors 17a or 17b will bleed slowly back through these lines, passages and ports to atmosphere. Thus control valves 5 or 7 will seal uniformly and gradually preventing damage or adverse wear and tear on the control valves and permit the system to operate with a minimum of surging and its converse problem of hunting in respect of the control system.

The pilot valve assemblies above described differ from those above described for the form of the invention shown in FIGS. 1 to 10 of the drawings because the trim spools 163a and 163b do not act to adjust the point at which the pilot valve assemblies will be actuated to open position. Adjustment of the trim spools in the rotary form of the invention acts to adjust the force required to actuate the pilot valves to open position and this will affect the level at which the float means 130 actuates one or the other of the pilot valve assemblies to open position.

Modulation of the signal or control pressure fluid is accomplished by the tapered valve heads 172a and 172b and the bleed screws affect the time within which the modulated signal will act to move control valve 5 or 7 from their normal closed position to open position for delivery process fluid to or draining process fluid from the reservoir as operation of the system requires.

The level of the process fluid 2 in the tank 1 is controlled by adjusting the position of the actuating arms or cam levers 151 and 152 as above described. By repositioning the engagement of the teeth 153 and 154 the positions of the respective hubs 146 and 147 can be varied to provide those positions for maintaining the process fluid 2 in the tank 1 between the desired predetermined maximum and minimum levels when system associated with the process fluid tank is in operation.

Adjustment of the trim spools will affect the response speed of the pilot valve assemblies on actuation thereof by the float assembly or means 130.

OPERATION OF ROTARY TYPE CONTROLLER

In the form of the invention shown in FIG. 11 to 16 pilot valve assembly 125 actuates and operates the fill valve 5 and pilot valve assembly 126 operates and actuates the drain valve 7.

Actuating arms or cam levers 151 and 152 are given a preliminary adjustment and the system will be placed in operation by opening a main delivery valve (not shown) to permit process fluid to pass through the inlet line 4 to the fill valve 5.

Since the reservoir is empty, the float valve assembly 130 will be signalling for fill action by the fill valve 5. Float 135 causes the operating shaft 131 to rotate the actuating arms 151 and 152 so that they move the valve stem 173a and valve head 172a to the full open position. Control pressure fluid will flow from the pressure line 170a through the fluid pressure inlet 171a to the signal or control pressure fluid chamber formed by the counter bores 164a in the pilot valve assemblies 125 and 126 respectively.

From the signal or control pressure fluid chamber 164a signal or control pressure fluid will pass through the valve port 166a into the control or signal pressure fluid chamber 169a and then through outlet 181a to the delivery line 18 in communication with the diaphragm type motor 17a of the control valve 5 to actuate the same to open position.

The tank or reservoir 1 will fill with process fluid until the float rotates the operating shaft 131 to cause the actuating arms 151 to disengage the valve stem 173a. Then the resilient means or spring 179a will move the valve head 172a into engagement with the valve seat elements 165a so as to discontinue delivery of signal pressure fluid to the diaphragm type motor 17a and as signal pressure fluid bleeds through waste port 183a as above described the pilot valve assembly 125 will return to its normally closed position.

Whenever process fluid delivered to the tank or reservoir 1 causes the float 135 to rise to a predetermined maximum level the float will rotate the operating shaft 131 causing the actuating arm or cam lever 152 in turn to engage the valve stem 173b of pilot valve assembly 126. This will gradually move the valve 172b so as to uncover the valve port 166b and signal or control pressure fluid will then pass from the pressure line 170b through the various ports and passages as above described to the pressure fluid delivery line 19 so as to actuate the diaphragm type motor 17b of the drain valve 7. The process fluid will thus be prevented from exceeding the predetermined maximum level for which the controller is set.

Similar to the operation above described when delivery of signal or control pressure fluid is terminated the pressure fluid remaining in the diaphragm type motor 17b and the connecting passages and lines will bleed to atmosphere through the waste port 183b.

The system will operate as a function of the rise and fall of the level of the process fluid as it is delivered to or removed from the fill line, drain line or use lines which are in communication with the tank or reservoir 1. As the level reaches the predetermined minimum the fill valve 5 will be actuated to deliver the process fluid to the tank or reservoir 1.

It is noted that rotation of operating shaft 131 will produce a corresponding clockwise and counter-clockwise movement of the pointer element 142 across the indicator face 144.

This movement of the pointer can be advantageously applied to actuate electric switch or relay means as at 190 and 191 which can be part of an electrical circuit for a remote recording means, not shown, or remote signal means, not shown, or a control board or the like panel also, not shown, to show or monitor operating condition of the level control system as will be understood by those skilled in the art.

ALTERNATE ROTARY TYPE CONTROLLER

In the form of the invention shown in FIGS. 11 to 16 the rotary type fluid level actuated controller illustrated has a single valve body having two pilot valve assemblies formed therein.

Figure 20:
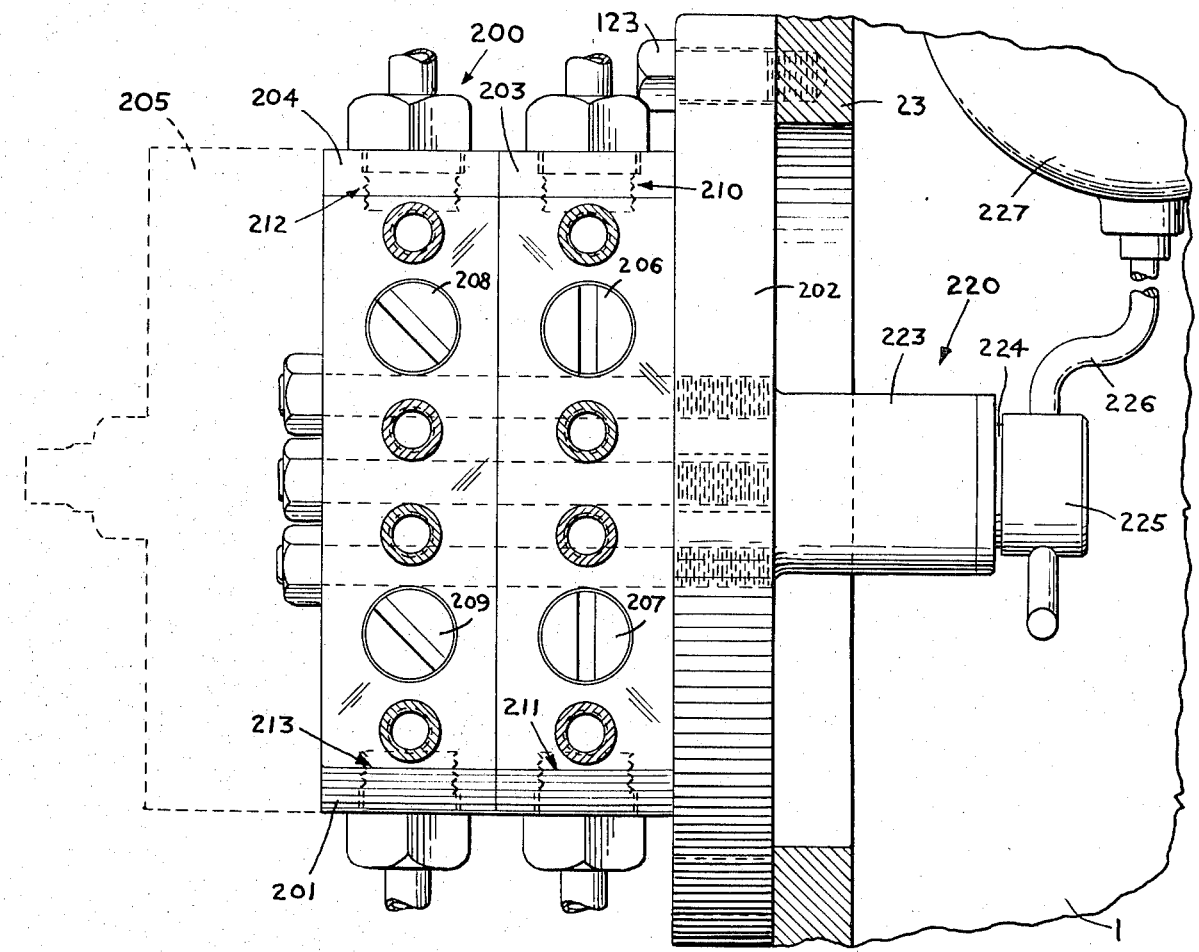
FIG. 20 is a top plan view of an alternate form of the fluid level actuated controller shown in FIG. 12 having an additional bank of pilot valves.
Figure 21:
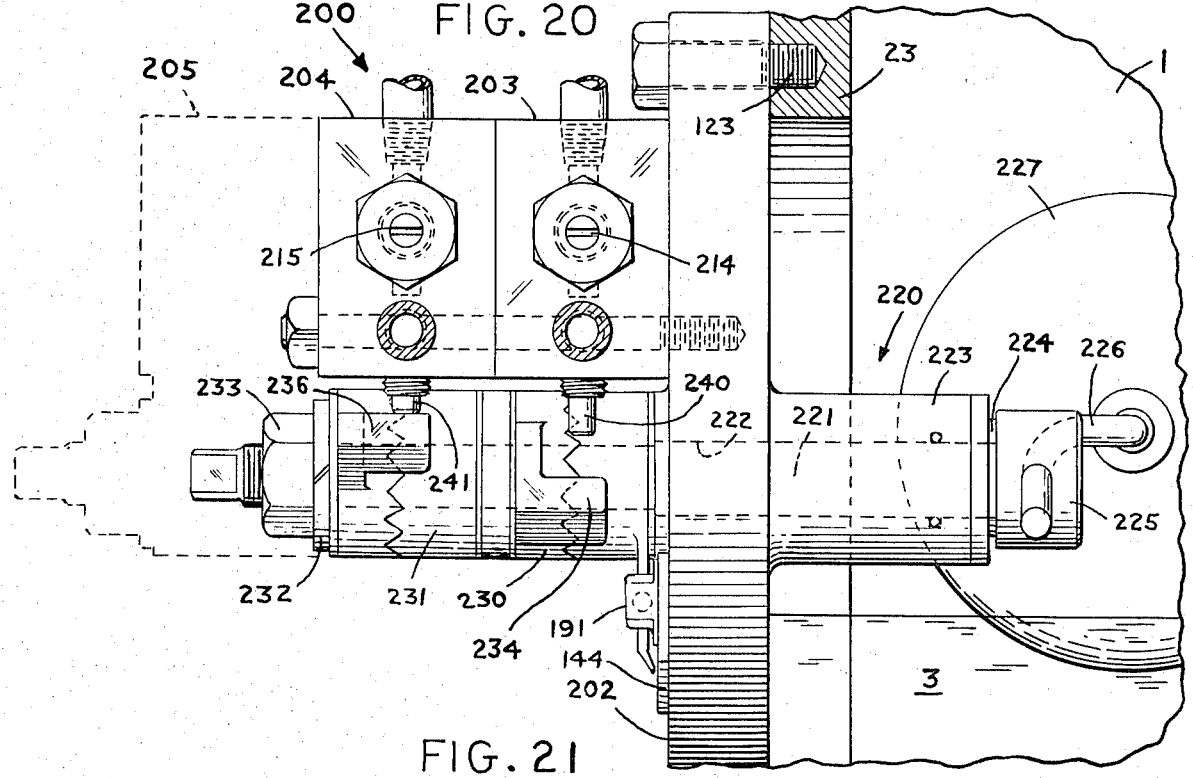
FIG. 21 is a side view of the alternate form of the fluid level actuated controller shown in FIG. 20.

In FIGS. 20 and 21, a rotary fluid level actuated controller 200 is illustrated having a valve body 201 with a plurality of pilot valve assemblies sections each respectively having a plurality of pilot valve assemblies formed therein.

In the illustrated form of the invention, the pilot valve assembly sections are modular units which can be mounted to each other as may be required, however, the valve body can be a unitary element formed from a single casting without departing from the scope of the present invention as will be understood by those skilled in the art.

Thus, referring to FIGS. 20 and 21, the valve body 201 is shown as connected or mounted onto the mounting flange 202 as in the earlier forms of the controllers above described.

The valve body 201 includes a plurality of pilot valve assembly sections as at 203 and 204 and although only two sections are illustrated additional sections may be added as is indicated by the phantomized lines designated 205.

Each of the pilot valve assembly sections 203 and 204 include pilot valve assemblies identical in construction to those above described for the rotary type fluid actuated controller shown in FIGS. 11 to 19 of the drawings. Accordingly, these pilot valve assemblies are not illustrated or described in more detail for this form of the invention.

By reference to FIG. 20, the trim spools 206 and 207 of the pilot valve assemblies for pilot valve assembly section 203 and trim spool 208 and 209 for pilot valve assembly section 204 are visible in the top or upper faces of the respective sections.

Similarly, FIGS. 20 and 21 show the bleed valve assemblies as at 210 and 211 on pilot valve assembly section 203 and 212 and 213 on pilot valve assembly section 204 and the bleed screws 214 for bleed valve assembly 211 and 215 for bleed valve assembly 213 are also illustrated.

The pilot valve assembly sections 203 and 204 coact with a rotary type float assembly generally designated 220 which includes an operating shaft 221 rotatably mounted in a bore 222 formed in the mounting flange 202 and an elongated boss 223 which extends into the tank 1 as shown in FIGS. 20 and 21.

The operating shaft 221 extends beyond the bore 222 in the elongated boss 223 and receives on the end thereof a washer 224 and an end cap 225. The end cap 225 is fixedly connected to one end of a goose neck shaped float arm 226 which has a float 227 at the end remote therefrom adapted to rise and fall with the level of the process fluid 3 in the tank 1 in exactly the same manner as that of the float means shown in the form of the invention shown in FIGS. 11 to 19 of the drawings.

When the float rises and falls it rotates the end cap which in turn rotates the operating shaft 221 in either a clockwise or counter-clockwise direction.

The operating shaft 221 extends beyond the exterior face of the mounting flange 202 along the central line of the mounting flange and centrally of the pilot valve assemblies in the respective pilot valve assembly sections 203 and 204.

The operating shaft 221 will be sized so its length is sufficient to mount a number of cam lever assemblies similar to the number of pilot valve assembly sections as may be provided in this form of the controller for a particular application.

Thus, FIG. 20 shows that the operating shaft has two cam lever assemblies as at 230 and 231 which are held in assembled position by lock washer 232 and lock nut 233 in the manner above described for the form of the invention shown in FIG. 11 to 19 of the drawings.

Each cam lever assembly will be provided with laterally extending actuating arms as at 234 and 235, not visible, on cam lever means 230 and 236 and 237, not visible, on cam lever means 231. The actuating arms 234 and 235, 236 and 237 will contact the valve stems of the respective pilot valve assemblies in the pilot valve assembly sections 203 and 204. Thus, actuating arm 234 is shown with its operatively associated valve stem 240 from one of the pilot valve assemblies in the pilot valve assembly section 203 and actuating arm 236 is shown with its coacting valve stem 241 from one of the pilot valve assemblies in the pilot valve assembly section 204.

The operation of this form of the invention is identical with that of the form of the invention above described except that this form of the invention produces means for actuating a greater number of control valves in response to the rise and fall of the process fluid in the tank 1.

Additionally, this arrangement provides for multiplexing the various control valves to perform a plurality of different functions either simultaneously or independently of each other as may be required for a particular application.

ALTERNATE PIVOT TYPE FLUID ACTUATED CONTROLLER

In FIGS. 22 to 29, another form of pivot type fluid actuated controller is illustrated which provides separate means for adjusting the predetermined minimum and maximum levels of the process fluid in the reservoir and retains the proportional band adjustment means for varying the speed of the modulated signal which is delivered to the fill valve drain valve for the system.

Thus, in this form of the invention, the range of level adjustment has a wider variation within which the change in the fluid level of the process fluid will produce corresponding operation of the fill valve or the drain valve of the system.

Figure 22:
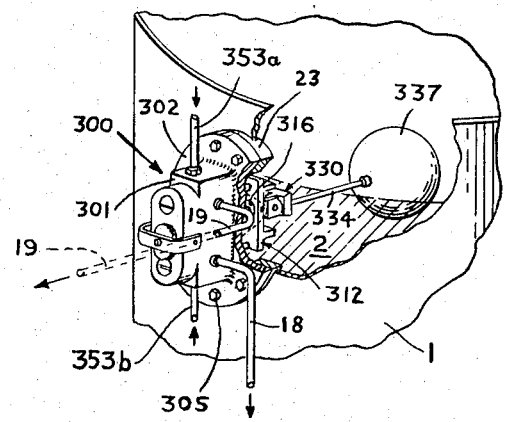
FIG. 22 is a schematic drawing of a fragment of a process fluid reservoir showing a portion of a fluid level control system mounted thereon similar to that shown in FIG. 1 having still another form of the fluid level actuated controller.
Figure 23:
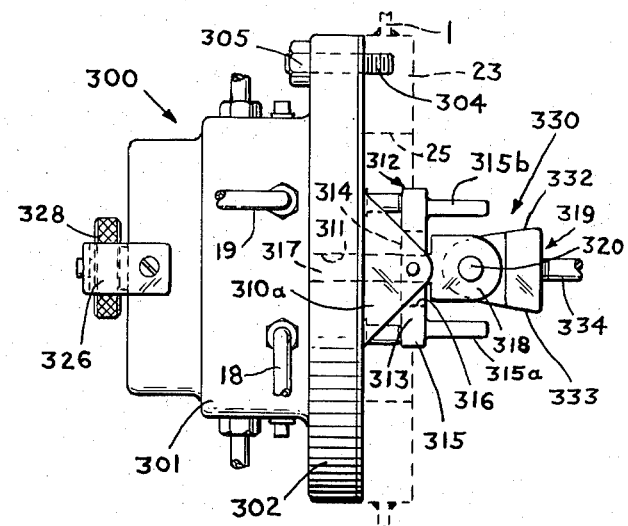
FIG. 23 is a top plan view of the fluid level actuated controller shown in FIG. 22.
Figure 24:
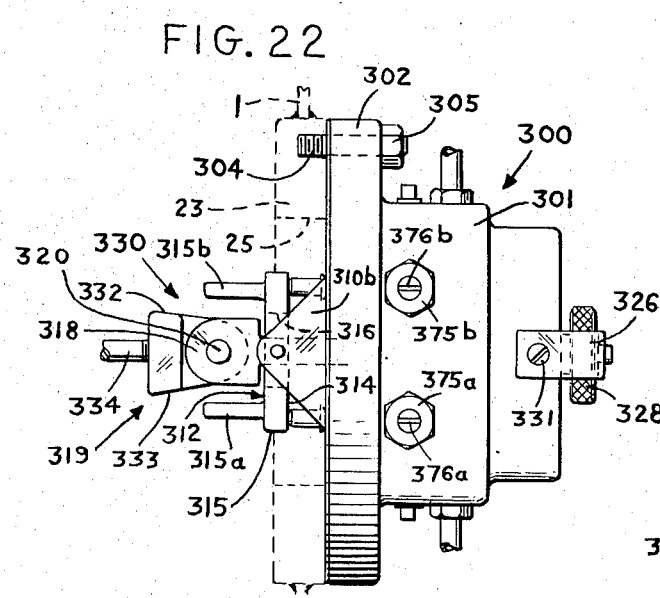
FIG. 24 is a right side view of the fluid level actuated controller shown in FIG. 22 with a fragment of the fluid level responsive means illustrated.
Figure 25:
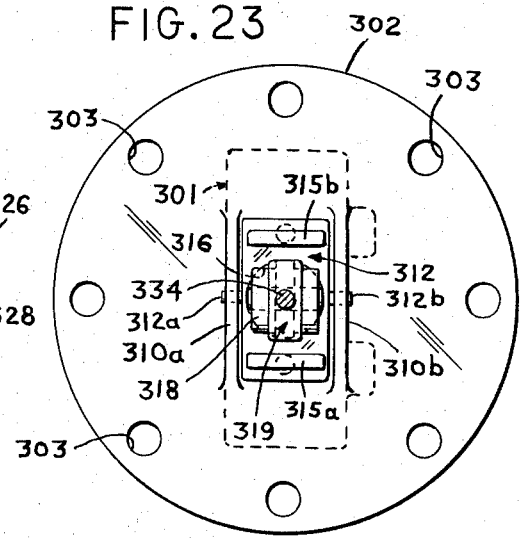
FIG. 25 is a front view of the fluid level actuated controller shown in FIG. 22.
Figure 26:
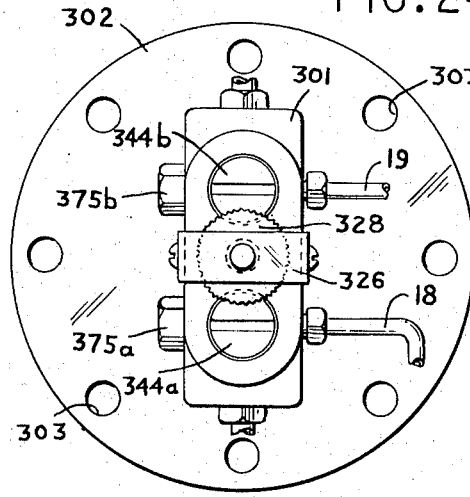
FIG. 26 is a rear view of the fluid level actuated controller in FIG. 22.
Figure 27:
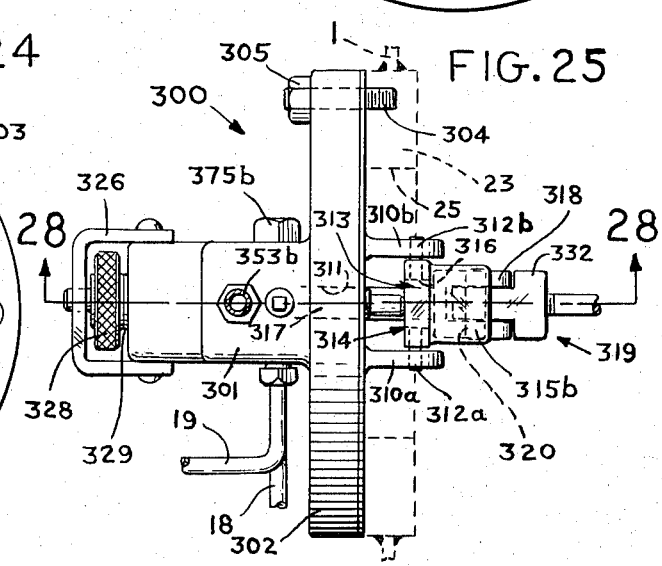
FIG. 27 is a top view of the fluid actuated controller shown in FIG. 22.

Referring to FIG. 22, this form of the controller is shown as being substituted in the same system as was utilized for the controller shown in FIGS. 1 to 10 of the drawings. Therefore, it is not deemed necessary to describe the details of the system shown in FIG. 22 and like numerals will be utilized for like parts.

Thus, in FIG. 22, tank 1 is shown as having this form of pivot type fluid level actuated controller 300 mounted thereon. The controller 300 includes a valve body 301 which may be fixedly connected or formed integrally with a mounting flange 302. Mounting flange 302 includes the usual plurality of circumferentially spaced openings 303 which provides means for connecting the controller 300 as by threaded members 304 and nut members 305 onto the connecting ring 23 in the side of the tank 1.

The connecting ring 23 is provided with an access opening 25 which permits a float assembly generally designated 330 operatively associated with the controller 300 to extend into the tank 1 for engagement with process fluid 2 stored or collected in the tank 1.

Valve body 301 is a recti-linear member similar to that of the controller shown in FIGS. 1 to 10 of the drawings and thus lies in the medial line of mounting flange 302. The valve body 301 has one or more pilot valve assemblies which are disposed in the valve body so that the pilot valve assemblies lie on opposite sides of the center line of the mounting flange.

The reason for spacing the pilot valve assemblies on opposite sides of the center line of the mounting flange for this form of the controller is that the means for adjusting the operative relation, between the float assembly 330 and the pilot valve assemblies, extends through the center line of the mounting flange 302 and the medial or central portion of the valve body 301 as will now be more fully described.

Thus, FIGS. 23 to 29 show that the front face of the mounting flange 302 includes, a pair of spaced lugs as at 310a and 310b. Lugs 310a and 310b lie on either side of a center opening or bore 311 lying in the center line of the mounting flange 302 and the medial portion of the valve body 301 and extending end to end therethrough. A pivot member 312 will be mounted on pivot shaft or pins 312a and 312b between the lugs 310a and 310b so as to pivot about an axis transverse to the longitudinal line of the center opening.

The pivot member 312 includes, an elongated flat member 313 having a flat planar face 314 on the side adjacent the mounting flange on the opposite face of the flat member 313 spaced stop fingers 315a and 315b are provided which extend parallel to the longitudinal line of the center bore 311.

In assembled position the pivot member 312 is shown as having an oval opening 316 in alignment with the center bore 311. This will permit an adjusting shaft 317 which is an elongated rod-like member to be slidably or movably mounted in the center bore 311 so that it will extend at one end through the oval opening 316 where it has a yoke type coupling 318 formed thereon in which is mounted the float pivot 319 on the float assembly 330 by a pivot shaft 320 as is shown in FIGS. 23 to 29 of the drawings.

At the opposite end the adjusting shaft 317 extends beyond the exterior of the valve body 301 where it is rotatably mounted in a bearing support 326 and as is shown in FIGS. 24, 26, 27 and 28 the end of the adjusting shaft 317 which extends to the exterior of the valve body 301 is threaded as at 327 so that an adjusting knob 328 can be mounted on the threaded end of the adjusting shaft to move the shaft in and out as the adjusting knob is turned clockwise and counterclockwise. A washer 329 is disposed between the adjusting knob and the exterior surface of the valve body 301 to permit free rotation of the adjusting knob 328 when it is desired to move the adjusting shaft from The bearing support 326 for the exterior of adjusting shaft 317 is a U-shaped member connected to the valve body 301 as by threaded means 331 so that the adjusting knob extends beyond the side edges thereof and the knurled surface thereof can be manually grasped for making the desired adjustment of the float assembly 330 connected thereto through the float pivot 319 as above described.

The stop fingers 315a and 315b coact with the upper face 332 and lower face 333 of the float pivot 318.

Float pivot 318 is tapered and will be moved by the adjusting shaft towards and away from the stop fingers so that the upper face 332 and the lower face 333 will engage the stop fingers at various points along the length of the respective faces, depending upon the adjusted positions of the float pivot, when the float assembly 330 causes the float pivot to rotate with the change in level of the process fluid 2 in the tank 1.

By reference to FIGS. 22 and 28 it can be seen that the float pivot has a hub section 336 which is provided with a threaded bore 335 which threadably receives one end of the float rod 334. Float rod 334 is an elongated member having at the end remote from the hub end a float means 337.

The float means 337 is threaded into the elongated float rod 336 and is provided with a suitable float assembly weight 338 which float assembly weight and float means are held on the float rod 334 by means of a suitable locking nut 339. The construction of the float rod, float means and float weight are identical to that as above described for the form of the invention shown in FIGS. 1 to 10.

The solid line illustration of the figures show the float assembly and the float pivot in the non-actuated position and the phantomized or dotted lines show the float assembly and the float pivot actuating one of the pilot valve assemblies which pilot valve assemblies are generally designated 340 and 341 and are shown in detail in FIG. 28 of the drawings.

The pilot valve assemblies 340 and 341 are similar to those shown and described for the pivot type form of controller shown in FIGS. 1 to 10 of the drawings.

Further, the pilot valve assemblies 340 and 341 are substantially identical in design and accordingly the same parts of each of these pilot valve assemblies will be given the same number but distinguished by a suitable character numeral in the same manner as applied to the controller shown in FIGS. 1 to 10 of the drawings.

Thus, the pilot valve assemblies 340 and 341 are shown as disposed in longitudinal bores 342a and 342b which extend inwardly along lines parallel to the center or longitudinal line of the valve body 301 and mounting flange 302, and these longitudinal bores 342a and 342b open onto the back or exterior surface of the valve body 301.

The portions of the longitudinal bores 342a and 342b which open adjacent the rear or exterior end of the valve body 301 are threaded as at 343a and 343b to permit trim spools 344a and 344b to be threadably mounted therein. Continuous with the longitudinal bores 342a and 342b and in alignment therewith are counter bores 345a and 345b which are of lesser diameter than the longitudinal bores 342a and 342b. The ends of the counter bores 345a and 345b remote from the longitudinal bores 342a and 342b communicate in turn with valve stem guide openings 346a and 346b.

In FIG. 28 the trim spools 344a and 344b are shown as cylindrical elements having a slightly reduced diameter at the end remote from the threaded end so that in assembled position there is formed with the inner wall of the respective londigutinal bores 342a and 342b in which the trim spools are mounted, annular fluid chambers 348a and 348b. Further, when the trim spools 344a and 344b are in assembled position, as shown in FIG. 28, they hold valve seat elements 349a and 349b in position against the shoulder formed between the longitudinal bores 342a and 342b and the aligned counter bores 345a and 345b and when so positioned cavities formed in the reduced diameter section of the trim spools 344a and 344b will form signal pressure fluid chambers as at 350a and 350b.

The main signal pressure fluid chamber 350a and 350b communicate through a plurality of circumferentially disposed ports 351a and 351b with the annular fluid chambers 348a and 348b. These annular fluid chambers at 348a and 348b in turn communicate with inlet ports 352a and 352b in the valve body 301 which receive the signal or control pressure fluid from signal pressure fluid delivery lines 353a and 353b connected to the inlet ports 352a and 352b.

The main signal pressure chamber 350a and 350b communicate with the counter bores 345a and 345b respectively through the associated valve ports 355a and 355b formed in the valve seat elements 349a and 349b.

To control flow of pressure fluid from the main signal pressure fluid chamber 350a and 350b to their associated counter bores 345a and 345b valve heads 360a and 360b are disposed for operative relation with the valve ports 355a and 355b in the valve seat element 349a and 349b.

FIG. 28 shows that the valve heads 360a and 360b are tapered so that the flow area through the valve ports may be gradually varied as the valve heads are brought into and out of engagement with the valve seat elements 349a and 349b for the same reasons as has been set forth above in respect of the pivot type controller shown in FIGS. 1 to 10 of the drawings.

Valve heads 360a and 360b are connected to valve stem push rods 361a and 361b. The valve stem push rods 361a and 361b extend through the valve stem guide openings 346a and 346b respectively so that the ends are disposed to engage the flat face 314 of the pivot member 312.

The valve heads 360a and 360b are each held normally closed in a non-actuated position by resilient means such as the springs 362a and 362b. The closed position is shown by the solid lines and the open position by the phantomized or dotted line position of the pivot member 312 in FIGS. 23, 24 and 28 of the drawings.

Suitable "0" ring seals as at 363a and 363b and packing nuts as at 367a and 367b are provided to maintain a fluid tight seal about the valve stem push rods to prevent leakage of process fluid to the tank 1 into the counter bores 345a and 345b.

In operation, when the pivot member 312 is rotated so that the front face 314 is brought into engagement with either valve stem push rod 361a or 361b these rods respectively on contact will be moved in a rearward direction which will cause the associated tapered valve heads 360a and 360b as the case may be to lift off the respective valve seat elements 349a and 349b so as to progressively expose a greater area of the valve port in the open valve for passing fluid from the main signal pressure fluid chamber 350a and 350b through one or other of the open valve ports into the associated counter bores 345a and 345b.

The pressure fluid for operating diaphragm type motors 17a and 17b for the control valve 5 or 7 will flow from the counter bores 345a and 345b through a suitable outlet passage as at 370a and 370b in the valve body 301 which is connected to the delivery lines 18 and 19, as is shown in FIGS. 22, 23 26 and 27 of the drawings.

Since the delivery lines 18 and 19 are connected to the diaphragm type motors 17a and 17b of the respective control valves 5 and 7 then when either of the pilot valve assemblies 340 or 341 are actuated to open position pressure fluid delivered to the counter bores 345a and 345b will be passed to one or the other of the diaphragm type motors to actuate the associated control valve 5 or controler valve 7 as may be required.

As in the form of the invention disclosed in FIGS. 1 to 10 of the drawings in order to regulate the rate at which air is delivered to the diaphragm type motors 17a and 17b of the respective control valve 5 and 7, bleed means generally designated 375a and 375b are provided with the conventional bleed screws 376a and 376b which can be rotated to adjust and bleed air from the counter bores 345a and 345b with which they are operatively associated.

The operation of the controller shown in FIGS. 22 to 29 of the drawings is substantially similar to that of the form of the invention above described for the form of the controller shown in FIGS. 1 to 10 of the drawings.

It differs to the extent that instead of adjusting the system with the trim spools 344a and 344b this form of controller adjusts the system by means of the adjusting shaft 317 so as to vary the operative engagement of the tapered faces 332 and 333 of the float pivot 318 with respect to the projecting stop fingers 315a and 315b on the pivot element 312.

Thus, in this form of the invention the preliminary adjustment for the system will be made by setting the adjusting shaft by means of the knurled adjusting knob 328 and by opening a main valve, not shown, to permit process fluid to pass through the inlet line 4 to the fill valve 5.

Thereafter operation of the system is the same in that the rise and fall of the float 337 will cause the float pivot 318 to rotate either in a clockwise or counterclockwise direction until the tapered surfaces 332 and 333 engage and move one or the other of the projecting stop fingers 315a and 315b and cause the pivot element 312 to rotate to engage one or the other of the valve stem push rods 361a or 361b, as the operation of the system may require.

When this occurs the valve heads 360a or 360b will gradually move so as to uncover the associated valve ports 355a or 355b and signal pressure fluid will then pass from the pressure lines to the diaphragm type motor to be actuated.

Since this operation has been fully described above, it is not deemed necessary to describe this operation more fully for this form of the invention.

In the event that it is described to modify the range of the predetermined minimum and predetermined maximum levels at which the float assembly will place the controller into operation than the adjusting knob 328 can be threaded in or out to move the float pivot 318 to provide the desired level range.

It will be understood that in order for the fill or over flow valve assemblies to function properly pressure fluid from the diaphragm type motors must bleed back through the bleed valves assemblies to atmosphere as in the earlier forms of the controllers above described. Thus, the bleed valves not only serve the function of adjusting or controlling the speed of response of the fill or drain control valve 5 and 7 but also serve as waste ports for the diaphragm type motors.

Thus, there has been described various forms of controllers for use in a float actuated liquid level control system in which the controllers monitor the liquid level in an atmospheric, pressurized or vacuum system.

While the foregoing description illustrates various preferred embodiments of apparatus and system in accordance with the present invention, it will be appreciated that certain changes and modifications may be made in the structure of these disclosed arrangements without departing from the spirit and scope of the invention and that the same is defined by the claims as hereinafter set forth.

What is claimed is:

1. A control valve responsive to the level of process fluid in a reservoir for delivering a modulated pressure fluid signal including,
   a. a valve body having a connecting means thereon for attaching said valve body to the reservoir,
   b. said valve body having an inlet for pressure fluid and an outlet for delivering signal pressure fluid,
   c. pilot valve assembly means disposed in said valve body between said inlet and outlet to modulate the flow of signal pressure fluid responsive to change in the level of process fluid in said reservoir,
   d. said pilot valve assembly means including,
      1. a valve chamber in said valve body in communication with said inlet and outlet,
      2. a valve seat means mounted in said valve body and forming a valve port therethrough in communication with said valve chamber to pass pressure fluid from the inlet to the outlet for the valve body,
      3. a tapered valve head mounted for slidable movement in the valve body towards and away from the valve seat means normally disposed to maintain said valve port closed,
      4. said valve body having a bore in alignment with the valve seat means communicating at one end with said valve chamber and at the end remote therefrom opening onto the exterior of said valve body,
      5. a valve stem slidably mounted in said bore connected at one end to the tapered valve head and having sufficient length to extend beyond the exterior of the valve body, and
      6. an adjustable bleed means in said valve body in communication with the valve chamber on the inlet side of the valve seat means to regulate the rate of response of said control valve,
   e. level responsive means movably connected on said valve body for engagement with the exterior portion of the valve stem to actuate the tapered valve head from fully open to fully closed positions relative the valve port responsive to the level of the process fluid in the reservoir and
   f. adjustable means on the valve body operatively disposed to vary the position of engagement between the valve stem and the level responsive means.

2. In a control valve as claimed in claim 1 including, pivot means on said level responsive means for pivotally connecting the level responsive means onto the valve body and to engage the exterior portion of the valve stem in any adjusted position thereof.

3. In a control valve as claimed in claim 1 wherein the adjustable means to vary the relative position of engagement includes, means connected to the valve seat means mounted for adjustable movement in the valve body.

4. In a control valve as claimed in claim 1 including,
   a. means mounted for movement in said valve body parallel to the axial line of the valve stem,
   b. pivot means in said level responsive means pivotally connected and movable with one end of the means movable parallel to the axial line of the valve stem to permit said pivot means to engage the exterior portion of the valve stem in any adjusted position thereof, and
   c. means on said means movable parallel to the axial line of the valve stem for adjustably positioning the same to vary the pivotal movement of said pivot means as a function of the desired level of the process fluid to be maintained.

5. In a control valve as claimed in claim 1 wherein the level responsive means includes,
   a. a member rotatably mounted in the valve body for movement about an axis parallel to the axial line of the valve body,
   b. a float member at one end of said rotatable member for rotating the same responsive to the rise and fall in the level of the process fluid,
   c. at least one actuating arm connected to the rotatable member at a point remote from the float means and rotatable therewith,
   d. said actuating arm positioned for operative engagement with the valve stem to move the valve stem as a function of the change in level of the process fluid in the reservoir.

6. In a control valve as claimed in claim 5 including,
   a. scale means connected to the exterior of the valve body to show the relative level of the process fluid in the reservoir,
   b. said rotatable member having one end extending to the exterior of the valve body adjacent said scale means, and
   c. an indicator member connected to the exterior end of the rotatable member and disposed for operative association with the scale member.

7. A control valve responsive to the level of process fluid in a reservoir for delivering a plurality of modulated fluid signals including,
   a. a valve body having a connecting means thereon for attaching the valve body to the reservoir,
   b. said valve body having at least two inlet means for pressure fluid and at least two outlet means associated respectively with said two inlet means, said outlet means for delivering signal pressure fluid therefrom,
   c. pilot valve assembly means disposed in said valve body between each associated pair of inlet means and outlet means to modulate the flow of signal pressure fluid responsive to change in the level of process fluid in said reservoir,
   d. each of said pilot valve assemblies including,
      1. a valve chamber in said valve body communicating with one of the pair of associated inlet means and outlet means,
      2. a valve seat means mounted in said valve body and forming a valve port therethrough in communication with a given valve chamber to pass pressure fluid from the given inlet means to its associated outlet means,
      3. a tapered valve head mounted for slidable movement in the valve body towards and away from the valve seat means normally disposed to maintain the valve port closed,
      4. said valve body having at least two bores and having one of said bores in alignment with each respective valve seat means so as to communicate at one end with the associated valve chamber and at the end remote therefrom to opening onto the exterior of said valve body,
      5. a valve stem slidably mounted in each of said bores and connected at one end to a tapered valve head and having sufficient length to extend beyond the exterior of the valve body, and
      6. an adjustable means in said valve body for each pilot valve assembly in communication with the associated valve chamber therefor on the inlet side of the valve seat means to regulate the rate of response of said control valve,
   e. level responsive means movably connected on said valve body for alternate engagement with the exterior portion of at least one valve stem to actuate the tapered valve head of a given pilot valve assembly from fully open to fully closed position relative the valve port responsive to the change in the level of the process fluid in the reservoir, and
   f. adjustable means on the valve body operatively disposed to vary the position of engagement between the valve stem and the level responsive means.

8. In a control valve as claimed in claim 7 including, a pivot means on said level responsive means for pivotally connecting the level responsive means onto the valve body and to engage the exterior portion of the valve stem in any adjusted position thereof.

9. In a control valve as claimed in claim 7 wherein the adjustable means to vary the relative position of engagement is connected to the valve seat means, and said valve seat means is movable on movement of the adjustable means.

10. A control valve as claimed in claim 7 including,
   a. means mounted for movement in said valve body parallel to the axial line of the valve stem,
   b. pivot means in said level responsive means pivotally connected and movable with one end of the means movable parallel to the axial line of the valve stem to permit said pivot means to engage the exterior portion of each respective valve stem in any adjusted position thereof, and
   c. means on said means movable parallel to the axial line of the valve body for adjustably positioning the same to vary the pivotal movement of said pivot means as a function of the desired level of the process fluid to be maintained.

11. In a control valve as claimed in claim 7 wherein the level responsive means includes:
   a. a member rotatably mounted in the valve body for movement about an axis parallel to the axial line of the valve body,
   b. a float member at one end of said rotatable member for rotating the same responsive to the rise and fall in the level of the process fluid,
   c. at least two acutating arms adjustably connectible to the rotatable member at a point remote from the float means and rotatable therewith,
   d. each of said actuating arms positioned for operative engagement with at least one valve stem to move the associated valve stem as a function of the change in level of the process fluid in the reservoir.

12. In a control valve as claimed in claim 11 including,
   a. scale means connected to the exterior of the valve body to show the relative level of the process fluid in the reservoir,
   b. said rotatable member having one end extending to the exterior of the valve body adjacent said scale means, and
   c. an indicator member connected to the exterior end of the rotatable member and disposed for operative association with the scale member.

13. In a control valve as claimed in claim 11 including,
   a. at least one other valve body in alignment with the valve body, b. said other valve body having at least two other inlet means for pressure fluid and at least two other outlet means associated respectively with said two other inlet means, said other outlet means for delivering signal pressure fluid,
c. a second plurality of pilot valve assembly means identical to said first mentioned pilot valve assembly means in said other valve body between each associated pair of other inlet valve means and other outlet valve means for providing a modulated signal pressure fluid to be delivered by a given other outlet means on actuation of the associated pilot valve assembly means therefor, and
d. said level responsive means having means connected thereto for operative association with said second plurality of pilot valve assembly means to actuate the same as a function of the change of level of the process fluid in the reservoir.

* * * * *